United States Patent
Arakane et al.

(10) Patent No.: US 10,882,327 B2
(45) Date of Patent: Jan. 5, 2021

(54) CONTROL DEVICE, PRINTING APPARATUS AND NON-TRANSITORY COMPUTER-READABLE RECORDING MEDIUM

(71) Applicant: Brother Kogyo Kabushiki Kaisha, Nagoya (JP)

(72) Inventors: Satoru Arakane, Nagoya (JP); Masashi Kuno, Obu (JP); Shota Morikawa, Nagoya (JP); Shin Hasegawa, Nagoya (JP); Yoshiharu Furuhata, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/570,200

(22) Filed: Sep. 13, 2019

(65) Prior Publication Data
US 2020/0086667 A1    Mar. 19, 2020

(30) Foreign Application Priority Data
Sep. 15, 2018    (JP) .................................. 2018-173134

(51) Int. Cl.
*B41J 2/21*    (2006.01)
*B41J 2/045*    (2006.01)
*G06K 15/10*    (2006.01)

(52) U.S. Cl.
CPC ......... *B41J 2/2132* (2013.01); *B41J 2/04563* (2013.01); *B41J 2/04568* (2013.01); *B41J 2/04571* (2013.01); *G06K 15/105* (2013.01)

(58) Field of Classification Search
CPC .................................................... B41J 2/2132
See application file for complete search history.

(56) References Cited

U.S. PATENT DOCUMENTS

| | | | | |
|---|---|---|---|---|
| 6,086,181 A * | 7/2000 | Majette | ............... | G06K 15/107 347/16 |
| 8,608,283 B1 * | 12/2013 | Phillips | ................. | B41J 2/2103 347/43 |
| 9,573,397 B1 * | 2/2017 | Ito | ........................ | B41J 11/0095 |
| 2016/0243822 A1 * | 8/2016 | Yoshida | ................ | B41J 2/5056 |
| 2018/0345692 A1 * | 12/2018 | Shomura | ............. | B41J 11/0045 |

FOREIGN PATENT DOCUMENTS

JP    2004-066550 A    3/2004

* cited by examiner

*Primary Examiner* — Shelby L Fidler
(74) *Attorney, Agent, or Firm* — Banner & Witcoff, Ltd.

(57) ABSTRACT

A control device controls an image printing by a printing execution unit. The control device performs: determination processing of determining whether a first condition indicating that a supply of ink from an ink supply unit to a printing head is possibly delayed at a partial printing is satisfied, for each of a plurality of band images included in an image to be printed and aligned in a sub-scanning direction; first printing processing of, in a case where the first condition is not satisfied, causing the printing execution unit to print the band image by single time partial printing; and second printing processing of, in a case where the first condition is satisfied, causing the printing execution unit to print each of N partial images included in the band image and aligned in the sub-scanning direction by single time partial printing, to print the band image by N times partial printings.

10 Claims, 14 Drawing Sheets

CONTROL DEVICE, PRINTING APPARATUS AND NON-TRANSITORY COMPUTER-READABLE RECORDING MEDIUM

CROSS-REFERENCE TO RELATED APPLICATION

This application claims priority from Japanese Patent Application No. 2018-173134 filed on Sep. 15, 2018, the entire subject-matter of which is incorporated herein by reference.

TECHNICAL FIELD

The present disclosure relates to control processing of controlling an image printing by a printing execution unit to by repeating partial printing of ejecting ink while executing a main scanning, and a sub-scanning respectively.

BACKGROUND

It is known that a printer for ejecting ink from a printing head to print an image. In the printer, for example, when a temperature of the ink is relatively low, a viscosity of the ink is increased, so that delay in ink supply from an accommodation part of the ink to the printing head is likely to occur. When the delay in ink supply occurs, an image quality may be deteriorated, such as thinning of a printed image. JP-A-2004-066550 discloses following technology. A threshold value is calculated on the basis of a temperature in the head. The number of continuously ejected dots is calculated from the number of continuous ejections in one scanning recording band. When the number of continuously ejected dots is larger than the threshold value, the number of passes is increased to reduce the number of continuous ejections of a recording head to be made in one recording scanning.

However, in a case where the number of passes is increased, it is susceptible of designing how to print.

SUMMARY

An object of the present disclosure is to provide a technology capable of suppressing delay in ink supply while preventing a print medium from being deformed at a printing.

One illustrative aspect provides a control device that controls an image printing executed by a printing execution unit,
the printing execution unit includes:
 a printing head having a plurality of nozzles for ejecting ink;
 an ink supply unit configured to supply the ink to the printing head;
 a main scanning unit configured to execute a main scanning of moving the printing head relative to a print medium in a main scanning direction; and
 a sub-scanning unit configured to execute a sub-scanning of moving the print medium relative to the printing head in a sub-scanning direction intersecting with the main scanning direction,
 in which the printing execution unit repeats partial printing of ejecting the ink from the printing head while the main scanning unit executes the main scanning, and the sub-scanning by the sub-scanning unit respectively, to print an image on the print medium, and
 in which the sub-scanning unit includes:
  an upstream roller conveying the print medium on a further upstream side than the printing head in the sub-scanning direction; and
  a downstream roller conveying the print medium on a further downstream side than the printing head in the sub-scanning direction, and
 the control device is configured to perform:
  determination processing of determining whether a first condition indicating that a supply of the ink from the ink supply unit to the printing head is possibly delayed at the partial printing is satisfied or not, for each of a plurality of band images included in an image to be printed and aligned in the sub-scanning direction;
  first printing processing of, in a case where the first condition is not satisfied, causing the printing execution unit to print the band image by single time partial printing; and
  second printing processing of, in a case where the first condition is satisfied, causing the printing execution unit to print each of N partial images (N is an integer of 2 or greater) included in the band image and aligned in the sub-scanning direction by single time partial printing, to print the band image by N times partial printings,
 in which in a case where the control device performs the second printing processing, the control device is configured to cause the printing execution unit to:
  in a first state that the print medium is supported by the upstream roller and is not supported by the downstream roller, print a first upstream partial image, which is located at an upstream end in the sub-scanning direction, included in the N partial images earlier than a first downstream partial image, which is located at a downstream end in the sub-scanning direction, included in the N partial images; and
  in a second state that the print medium is not supported by the upstream roller and is supported by the downstream roller, print a second downstream partial image, which is located at a downstream end in the sub-scanning direction, included in the N partial images earlier than a second upstream partial image, which is located at an upstream end in the sub-scanning direction, included in the N partial images.

The aspect provides a printing apparatus including:
the control device described above; and
a printing execution unit including:
 a printing head having a plurality of nozzles for ejecting ink;
 an ink supply unit configured to supply the ink to the printing head;
 a main scanning unit configured to execute a main scanning of moving the printing head relative to a print medium in a main scanning direction; and
 a sub-scanning unit configured to execute a sub-scanning of moving the print medium relative to the printing head in a sub-scanning direction intersecting with the main scanning direction,
 in which the printing execution unit repeats partial printing of ejecting the ink from the printing head while the main scanning unit executes the main scanning, and the sub-scanning by the sub-scanning unit respectively, to print an image on the print medium.

The aspect provides a non-transitory computer-readable recording medium storing computer-readable instructions for a control device that controls an image printing executed by a printing execution unit,
the printing execution unit includes:
 a printing head having a plurality of nozzles for ejecting ink;

an ink supply unit configured to supply the ink to the printing head;

a main scanning unit configured to execute a main scanning of moving the printing head relative to a print medium in a main scanning direction; and a sub-scanning unit configured to execute a sub-scanning of moving the print medium relative to the printing head in a sub-scanning direction intersecting with the main scanning direction, in which the printing execution unit repeats partial printing of ejecting the ink from the printing head while the main scanning unit executes the main scanning, and the sub-scanning by the sub-scanning unit respectively, to print an image on the print medium, and in which the sub-scanning unit includes:

an upstream roller conveying the print medium on a further upstream side than the printing head in the sub-scanning direction; and a downstream roller conveying the print medium on a further downstream side than the printing head in the sub-scanning direction, and the computer-readable instructions, when executed by the control device, causing the control device to perform:

determination processing of determining whether a first condition indicating that a supply of the ink from the ink supply unit to the printing head is possibly delayed at the partial printing is satisfied or not, for each of a plurality of band images included in an image to be printed and aligned in the sub-scanning direction;

first printing processing of, in a case where the first condition is not satisfied, causing the printing execution unit to print the band image by single time partial printing; and second printing processing of, in a case where the first condition is satisfied, causing the printing execution unit to print each of N partial images (N is an integer of 2 or greater) included in the band image and aligned in the sub-scanning direction by single time partial printing, to print the band image by N times partial printings, in which in a case where the control device performs the second printing processing, the computer-readable instructions cause the printing execution unit to perform:

in a first state that the print medium is supported by the upstream roller and is not supported by the downstream roller, print a first upstream partial image, which is located at an upstream end in the sub-scanning direction, included in the N partial images earlier than a first downstream partial image, which is located at a downstream end in the sub-scanning direction, included in the N partial images; and in a second state that the print medium is not supported by the upstream roller and is supported by the downstream roller, print a second downstream partial image, which is located at a downstream end in the sub-scanning direction, included in the N partial images earlier than a second upstream partial image, which is located at an upstream end in the sub-scanning direction, included in the N partial images.

According to the above configuration of the control device, the printing apparatus and the non-transitory computer-readable medium, when the first condition indicating that a supply of the ink from the ink supply unit to the printing head is possibly delayed at the partial printing is satisfied, the N partial images included in the band image are printed one by one by the N times partial printings. Therefore, it is possible to suppress the delay in ink supply. In the case where the first condition is satisfied, the partial image of the N partial images, which is located at the end in the sub-scanning direction closed to the roller, which supports the print medium, out of the upstream roller and the downstream roller is printed earlier than the partial image located at the opposite side end in the sub-scanning direction. Therefore, it is possible to prevent the print medium from being deformed at a printing of the later partial image.

In the meantime, the technology of the present disclosure can be implemented in a variety of forms, such as a control method and a control device of the printing execution unit, a printing method, a printing apparatus, a computer program for implementing functions of the method or apparatus, a recording medium (for example, a non-transitory computer-readable recording medium) having the computer program (computer-readable instructions) recorded therein, and the like.

DETAILED DESCRIPTION

A. First Exemplary Embodiment

A-1. Configurations of Terminal Apparatus 100 and Multifunction Machine 200

Figure 1:
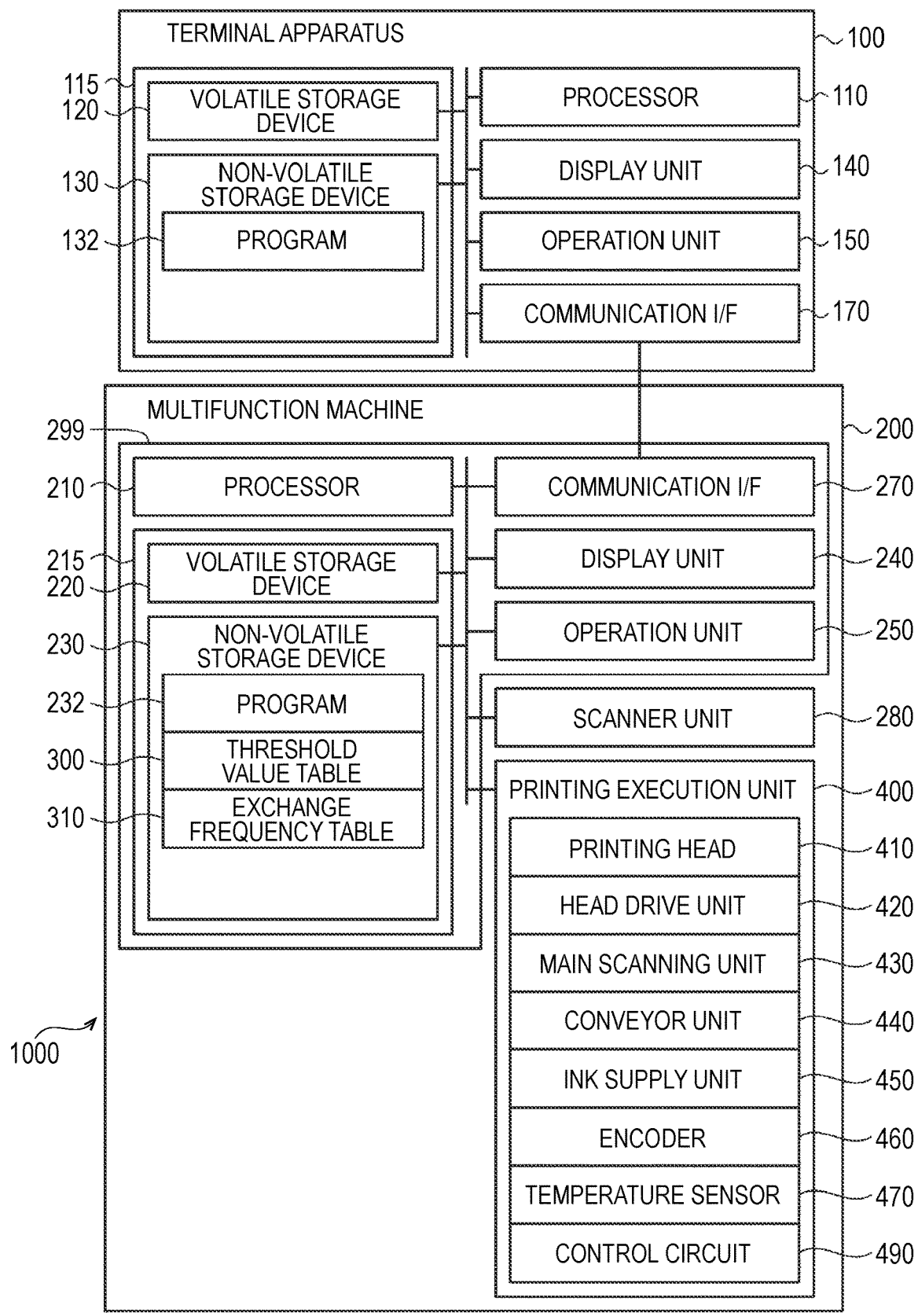
FIG. 1 depicts an image processing system 1000 of an exemplary embodiment.

FIG. 1 depicts an image processing system 1000 of an exemplary embodiment. The image processing system 1000 includes a terminal apparatus 100, and a multifunction machine 200 connected to the terminal apparatus 100. As described later, the multifunction machine 200 includes a scanner unit 280 configured to read a target such as a document, a printing execution unit 400 configured to print an image, and a control unit 299 configured to control the entire multifunction machine 200.

The terminal apparatus 100 is a personal computer (for example, a desktop computer, a tablet computer, and the like). The terminal apparatus 100 includes a processor 110, a storage device 115, a display unit 140 configure to display an image, an operation unit 150 configured to receive a user's operation, and a communication interface 170.

The constitutional elements are connected each other via a bus. The storage device 115 includes a volatile storage device 120, and a non-volatile storage device 130.

The processor 110 is a device configured to execute data processing, and is a CPU, for example. The volatile storage device 120 is, for example, a DRAM, and the non-volatile storage device 130 is, for example, a flash memory.

In the non-volatile storage device 130, a program 132 is stored. The processor 110 is configured to implement diverse functions of controlling the multifunction machine 200 by executing the program 132. The functions that are implemented by the program 132 will be described in detail later. The processor 110 is configured to temporarily store a variety of intermediate data, which are used when executing the program 132, in the storage device 115 (for example, any one of the volatile storage device 120 and the non-volatile storage device 130). In the first exemplary embodiment, the program 132 is included in a device driver provided by a manufacturer of the multifunction machine 200.

The display unit 140 is a device configured to display an image, and is a liquid crystal monitor, for example. Instead, the other devices configured to display an image, such as an LED display, an organic EL display and the like may be adopted. The operation unit 150 is a device configured to receive a user's operation, and is a touch panel arranged with being superposed on the display unit 140, for example. Instead, the other devices to be operated by the user, such as a button, a lever and the like may be adopted. The user can input a variety of instructions to the terminal apparatus 100 by operating the operation unit 150.

The communication interface 170 is an interface for performing communication with other devices (for example, a USB interface, a wired LAN interface, a wireless interface of IEEE 802.11). The communication interface 170 is connected to the multifunction machine 200.

The multifunction machine 200 includes a control unit 299, a scanner unit 280, and a printing execution unit 400. The control unit 299 includes a processor 210, a storage device 215, a display unit 240 configured to display an image, an operation unit 250 configured to receive a user's operation, and a communication interface 270. The constitutional elements are connected each other via a bus. The storage device 215 includes a volatile storage device 220, and a non-volatile storage device 230.

The processor 210 is a device configured to execute data processing, and is a CPU, for example. The volatile storage device 220 is, for example, a DRAM, and the non-volatile storage device 230 is, for example, a flash memory.

In the non-volatile storage device 230, a program 232, a threshold value table 300, and an exchange frequency table 310 are stored. The processor 210 is configured to implement diverse functions by executing the program 232 (which will be described in detail later). The processor 210 is configured to temporarily store a variety of intermediate data, which are used when executing the program 232, in the storage device 215 (for example, any one of the volatile storage device 220 and the non-volatile storage device 230). In the first exemplary embodiment, the program 232, the threshold value table 300 and the exchange frequency table 310 are included in advance in the non-volatile storage device 230 by a manufacturer of the multifunction machine 200, as firmware. The threshold value table 300 and the exchange frequency table 310 will be described in detail later.

The display unit 240 is a device configured to display an image, and is a liquid crystal monitor, for example. Instead, the other devices configured to display an image, such as an LED display, an organic EL display and the like may be adopted. The operation unit 250 is a device configured to receive a user's operation, and is a touch panel arranged with being overlapped on the display unit 240, for example. Instead, the other devices to be operated by the user, such as a button, a lever and the like may be adopted. The user can input a variety of instructions to the multifunction machine 200 by operating the operation unit 250.

The communication interface 270 is an interface for performing communication with other devices. In the first exemplary embodiment, the communication interface 270 is connected to the communication interface 170 of the terminal apparatus 100.

The scanner unit 280 is configured to optically read a target such as a document by using a photoelectric conversion element such as a CCD, a CMOS and the like, thereby generating scan data expressing the read image (referred to as 'scanned image'). The scan data is, for example, RGB bitmap data expressing a color scanned image.

The printing execution unit 400 is a device configured to print an image on a sheet (an example of a print medium). In the first exemplary embodiment, the printing execution unit 400 includes a printing head 410 (simply referred to as 'head 410'), a head drive unit 420, a main scanning unit 430, a conveyor unit 440, an ink supply unit 450, an encoder 460, a temperature sensor 470, and a control circuit 490 configured to control the elements 410, 420, 430, 440, 450, 460, 470. Although specifically described later, the printing execution unit 400 is an inkjet printing apparatus in which inks of cyan C, magenta M, yellow Y and black K are used. In the meantime, the combination of the plurality of types of useable inks is not limited to CMYK, and other diverse combinations (for example, cyan C, magenta M and yellow Y) may be adopted.

The multifunction machine 200 can enable the printing execution unit 400 to print an image by using print data supplied from the other apparatus (for example, the terminal apparatus 100). Also, the multifunction machine 200 can generate print data by using image data selected by the user, and enable the printing execution unit 400 to print an image by using the generated print data. The user can select the scan data, and the image data stored in an external device (for example, a memory card connected to the communication interface 270).

Figure 2:
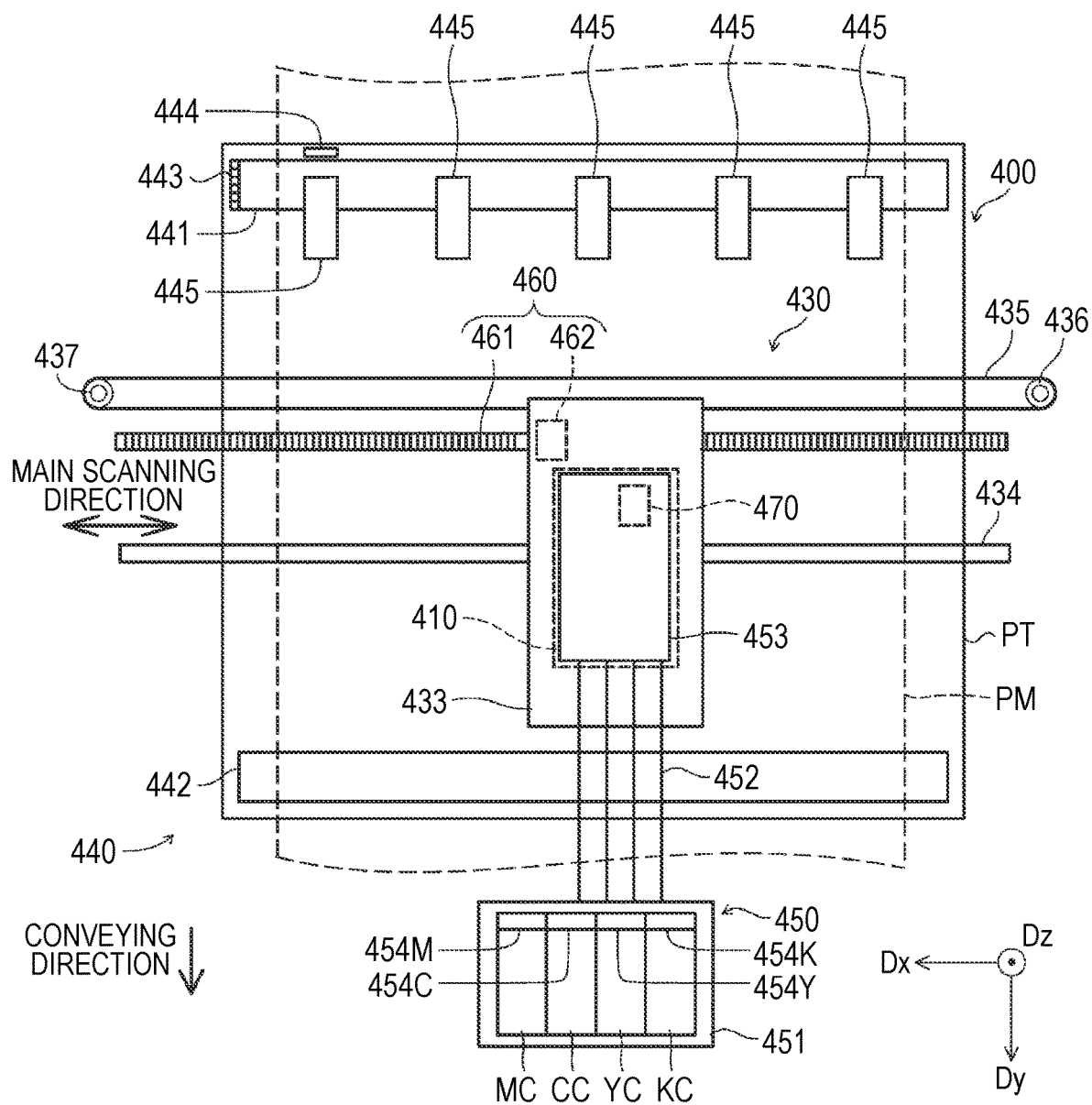
FIG. 2 is a schematic view of a printing execution unit 400.

FIG. 2 is a schematic view of the printing execution unit 400. The main scanning unit 430 includes a carriage 433, a slide shaft 434, a belt 435, and a plurality of pulleys 436, 437. The printing head 410 is mounted on the carriage 433. The slide shaft 434 is configured to hold the carriage 433 so as to be reciprocally moveable in a main scanning direction (Dx axis direction in FIG. 2). The belt 435 is wound on the pulleys 436, 437, and a part thereof is fixed to the carriage 433. The pulley 436 is rotated by power of a main scanning motor (not shown). When the main scanning motor rotates the pulley 436, the carriage 433 moves along the slide shaft 434. Thereby, a main scanning of reciprocally moving the printing head 410 relative to the sheet PM in the main scanning direction is implemented.

The conveyor unit 440 is configured to convey the sheet PM relative to the printing head 410 in a conveying direction (+Dy direction, in FIG. 2) while holding the sheet PM. Hereinbelow, an upstream side (−D side) in the conveying direction is simply referred to as 'upstream side', and a downstream side (+D side) in the conveying direction is simply referred to as 'downstream side'. The conveyor unit 440 includes a platen PT arranged in a position facing an ink ejection surface of the printing head 410 and configured to support the sheet PM, an upstream roller 441, a downstream roller 442 and a plurality of pressing parts 445, each of which is configured to hold the sheet PM placed on the platen PT, and a motor (not shown). The upstream roller 441 is arranged upstream of the printing head 410, and the downstream roller 442 is arranged downstream of the printing head 410. The sheet PM is fed from a sheet tray (not shown) to the conveyor unit 440 by a feeder roller (not shown). The sheet PM fed to the conveyor unit 440 is sandwiched between the platen PT and the upstream roller 441, and is thus held by the platen PT and the upstream roller 441. The sheet PM conveyed by the upstream roller 441 is sandwiched between the platen PT and the downstream roller 442 and is thus held by the platen PT and the downstream roller 442. The plurality of pressing parts 445 is arranged upstream of the printing head 410. In the first exemplary embodiment, each of the plurality of pressing parts 445 is an elastic plate configured to press the sheet PM on the platen PT toward the platen PT between the upstream roller 441 and the printing head 410. The conveyor unit 440 is configured to drive the rollers 441, 442 by the power of the motor, thereby conveying the sheet PM in the conveying direction. Hereinbelow, processing of moving the sheet PM in the conveying direction is referred to as sub-scanning. The conveying direction is referred to as a sub-scanning direction, too.

The conveyor unit 440 further includes a rotary encoder 443, and a sheet sensor 444. The rotary encoder 443 is a rotation amount sensor configured to output a pulse in accordance with a rotation amount of the upstream roller 441. The sheet sensor 444 is a sensor configured to detect the sheet PM. The sheet sensor 444 is configured to output any one of an on signal, which indicates that the sheet PM is detected, and an off signal, which indicates that the sheet PM is not detected. The sheet sensor 444 is arranged upstream of the upstream roller 441, in the vicinity of the upstream roller 441. When a downstream end of the sheet PM passes a position of the sheet sensor 444, the signal from the sheet sensor 444 is changed from the off signal to the on signal. When an upstream end of the sheet PM passes the position of the sheet sensor 444, the signal from the sheet sensor 444 is changed from the on signal to the off signal. The control unit 299 (FIG. 1) and the control circuit 490 can specify a position of the sheet PM in the conveying direction, based on the rotation amount of the upstream roller 441 after the signal of the sheet sensor 444 is changed from the off signal to the on signal. In the meantime, the configuration of the sheet sensor 444 may be any configuration for detecting the sheet PM. For example, the sheet sensor 444 may include a mechanical switch configured to operate as a result of contact with the sheet PM or may include a light-emitting element and a light-receiving element configured to optically detect the sheet PM.

The ink supply unit 450 is configured to supply ink to the printing head 410. The ink supply unit 450 includes a cartridge mounting unit 451, tubes 452, and a buffer tank 453. A plurality of ink cartridges KC, YC, CC, MC in which inks are accommodated is detachably mounted to the cartridge mounting unit 451, and the inks are supplied from the ink cartridges. The cartridge mounting part 451 is provided with cartridge sensors 454K, 454Y, 454C, 454M configured to detect the ink cartridges KC, YC, CC, MC. The cartridge sensors 454K, 454Y, 454C, 454M are configured to output any one of an on signal, which indicates that the ink cartridges KC, YC, CC, MC are detected, and an off signal, which indicates that the ink cartridges KC, YC, CC, MC are not detected. The buffer tank 453 is arranged above the printing head 410 mounted to the carriage 433, and is configured to temporarily accommodate therein each ink of CMYK to be supplied to the printing head 410. The tube 452 is a flexible tube configured to interconnect the cartridge mounting unit 451 and the buffer tank 453 and becoming a flow path of the ink. The ink in each ink cartridge is supplied to the printing head 410 through the cartridge mounting unit 451, the tube 452 and the buffer tank 453. The buffer tank 453 is provided with a filter (not shown) for removing foreign matters mixed in the ink.

Figure 3:
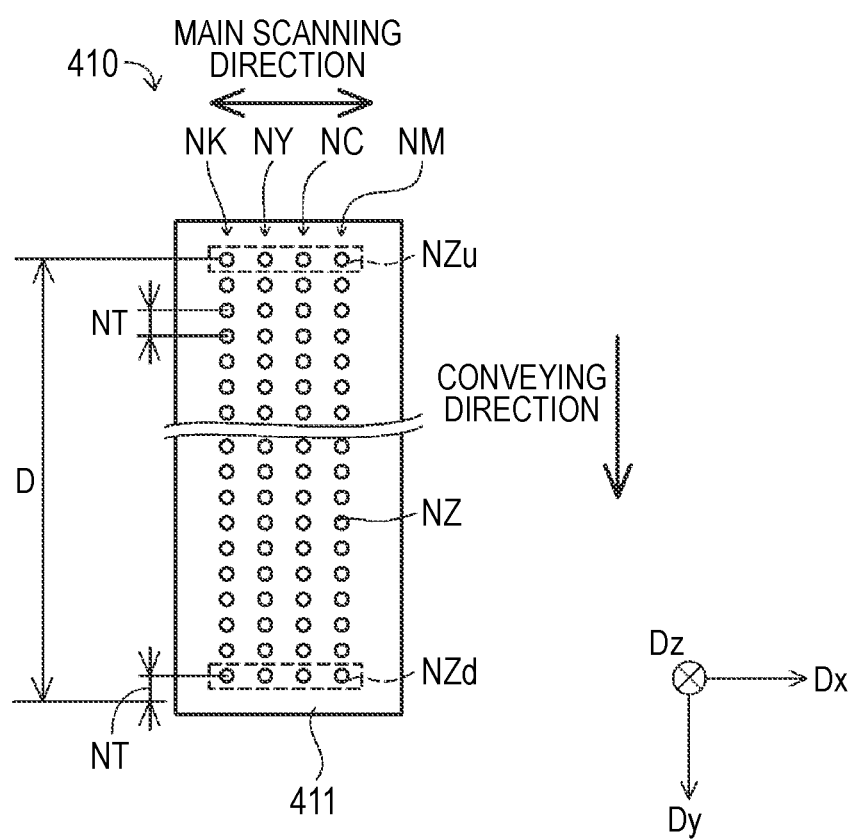
FIG. 3 depicts a configuration of a printing head 410.

FIG. 3 depicts a configuration of the printing head 410, as seen from −Dz side. As shown in FIG. 3, a nozzle formation surface 411 of the printing head 410 is a surface facing the sheet PM to be conveyed by the conveyor unit 440 (FIG. 2). The nozzle formation surface 411 is formed with a plurality of nozzle rows consisting of a plurality of nozzles NZ, i.e., nozzle rows NC, NM, NY, NK for ejecting the respective inks of C, M, Y and K. Each nozzle row includes a plurality of nozzles NZ. The plurality of nozzles NZ has positions different from each other in the conveying direction (+Dy direction), and is aligned with predetermined nozzle intervals NT in the conveying direction. The nozzle interval NT is a length in the conveying direction between two nozzles NZ, which are adjacent to each other in the conveying direction, of the plurality of nozzles NZ. A nozzle NZ, which is located on the most upstream side (−D side), of the nozzles configuring the nozzle row is referred to as the most upstream nozzle NZu. Also, a nozzle NZ, which is located on the most downstream side (+D side), of the nozzles is referred to as the most downstream nozzle NZd. A length obtained by adding the nozzle interval NT to a length in the conveying direction from the most upstream nozzle NZu to the most downstream nozzle NZd is referred to as 'nozzle length D'.

Positions of the nozzle rows NC, NM, NY, NK in the main scanning direction are different, and positions thereof in the sub-scanning direction overlap each other. In the example of FIG. 3, the nozzle rows NK, NY, NC, NM are aligned in corresponding order in the +Dx direction.

Each nozzle NZ is connected to the buffer tank 453 through an ink flow path (not shown) formed in the printing head 410. The respective ink flow paths are provided with actuators (not shown; for example, piezo elements, heaters and the like) for ejecting the inks.

The head drive unit 420 (FIG. 1) includes an electric circuit configured to drive each actuator in the printing head 410 during the main scanning by the main scanning unit 430, in accordance with the print data. Thereby, the inks are ejected from the nozzles NZ of the printing head 410 onto the sheet PM, so that dots are formed.

When the ink is ejected from the nozzles NZ (FIG. 3) during the printing, the ink is reduced in the buffer tank 453 (FIG. 2) by an ejected amount of the ink, so that a negative pressure is generated in the buffer tank 453. By the negative pressure, the ink is supplied from the ink cartridge to the buffer tank 453 through the cartridge mounting unit 451 and the tube 452. When a large amount of ink is ejected from the plurality of nozzles NZ in a short time for printing, the ink supply to the buffer tank 453 may be delayed. When the delay in ink supply occurs, even though the actuator is actuated, a malfunction that the ink is not ejected from the nozzles NZ or a malfunction that a smaller amount of ink than expected is ejected occurs. When such malfunction occurs, a color is thinned and an image quality is thus degraded in a printed image.

The delay in ink supply is likely to occur when flowability of the ink is lowered. For example, the lower a temperature (hereinafter, also referred to as 'head temperature') of the printing head 410 is, the more the delay in ink supply is likely to occur. The reason is that as the head temperature is lowered, a viscosity of the ink is increased, resulting in a decrease in flowability of the ink.

Also, the delay in ink supply is likely to occur when a cumulative-used amount of ink increases. The cumulative-used amount of ink is a cumulative-used amount of ink up to now since the manufacturing of the multifunction machine 200, and is specified for each ink. As the cumulative-used amount of ink increases, an accumulation amount of foreign matters in a filter for removing the foreign matters in the ink increases, resulting in an increase in flow path resistance of the ink and a decrease in flowability of the ink. Therefore, as the cumulative-used amount of ink increases, the ink supply may be delayed.

As described later, printing execution processing of the first exemplary embodiment is configured to suppress the delay in ink supply.

The encoder 460 (FIG. 1 and FIG. 2) is a device configured to detect a position of the printing head 410 in the main scanning direction, and is a so-called linear encoder. As shown in FIG. 2, the encoder 460 includes a linear scale 461, and an optical sensor 462. The linear scale 461 is a band-shaped member extending in the main scanning direction, and is fixed in a housing. The linear scale 461 is alternately formed with a transmission part through which light is to penetrate and a non-transmission part through which light is not to penetrate, in a longitudinal direction. As shown in FIG. 2, the optical sensor 462 is mounted on the carriage 433, and is configured to move together with the printing head 410 during the main scanning. The optical sensor 462 includes a light-emitting element and a light-receiving element, and is arranged so that the linear scale 461 is positioned between the light-emitting element and the light-receiving element. During the main scanning in which the carriage 433 (the printing head 410) moves in the main scanning direction, light emitted from the light-emitting element penetrates the transmission part of the linear scale 461 and is received by the light-receiving element, and the light is interrupted by the non-transmission part and is not thus received by the light-receiving element, which operations are repeatedly performed. The encoder 460 is configured to output a pulse signal indicative of a change in light received by the light-receiving element of the optical sensor 462. Based on the pulse signal, it is possible to acquire a position of the carriage 433 in the main scanning direction. Therefore, the pulse signal can be said as a position signal indicative of a position of the carriage 433 in the main scanning direction. The position signal output from the encoder 460 is supplied to the control circuit 490 and is used to control the main scanning and the printing head 410.

The temperature sensor 470 (FIG. 2) is a well-known temperature sensor including a temperature measurement resistance member and the like, and is fixed to the printing head 410. The temperature sensor 470 is configured to output a signal indicative of a temperature of the printing head 410.

A-2. Outline of Printing

The printing execution unit 400 repeats partial printing of ejecting the inks from the printing head 410 to form dots on the sheet PM while the main scanning unit 430 executes the main scanning, and a sub-scanning (conveyance of the sheet PM) by the conveyor unit 140 respectively, to print an image on the sheet PM.

Figure 4A:
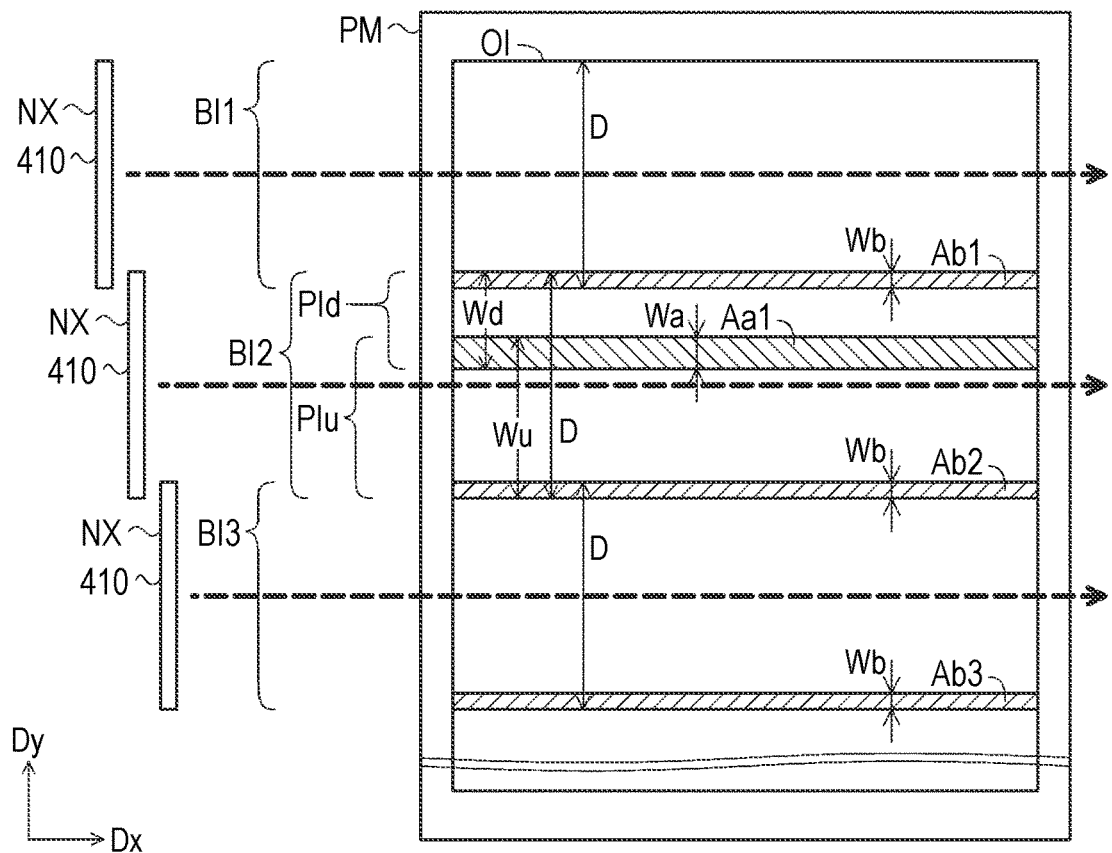
FIG. 4A illustrates an example of operations of the printing execution unit 400.

FIG. 4A illustrates an example of operations of the printing execution unit 400. In FIG. 4A, a printed image OI to be printed on the sheet PM is shown. In FIG. 4A, the +Dy direction is the conveying direction (i.e., the sub-scanning direction) of the sheet PM. The printed image OI includes a plurality of band images BI1 to BI3 aligned in the −Dy direction (more generally, the sub-scanning direction). Each of the band images BI1 to BI3 has a rectangular shape extending in the main scanning direction (here, the Dx axis direction). Each of the band images BI1 to BI3 is usually printed by single time partial printing. At the left of each of the band images BI1 to BI3, the simplified nozzle row NX of the printing head 410 for printing each of the band images BI1 to BI3 is shown. The nozzle row NX is shown as a representative of the nozzle rows NC, NM, MY, NK in FIG. 3. A width of each of the band images BI1 to BI3 in the sub-scanning direction is preset, and is the same as the nozzle length D (FIG. 3) in the first exemplary embodiment.

In the first exemplary embodiment, a printing direction of the partial printing is determined in advance as one of a forward direction and a backward direction. Hereinbelow, it is assumed that the printing direction is the forward direction (+Dx direction in FIG. 4). In the partial printing, dots are formed while executing the main scanning of moving the printing head 410 in the forward direction. Hereinbelow, single time partial printing is referred to as "pass processing" or "pass", too.

The plurality of band images is printed one by one in order from a band image at an end of the printed image OI in the +Dy direction toward the −Dy direction. Two band images adjacent to each other are partially overlapped. Superimposition areas Ab1 to Ab3 in FIG. 4 indicate areas in which two band images adjacent to each other are overlapped. For example, the first superimposition area Ab1 is an area in which the first band image BI1 and the second band image BI2 are overlapped. Each of the superimposition areas Ab1 to Ab3 has a rectangular shape extending in the main scanning direction. A width Wb is a width of each of the superimposition areas Ab1 to Ab3 in the sub-scanning direction.

Figure 4B:
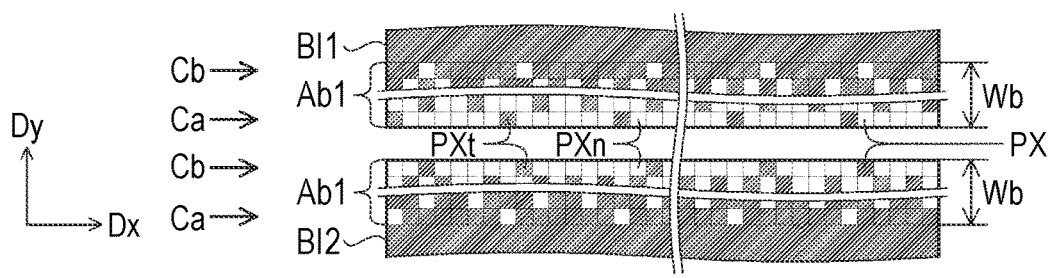
FIG. 4B illustrates a second-type superimposition area.

FIG. 4B illustrates the superimposition area. In FIG. 4B, an upstream (−Dy side) end portion, which includes the first superimposition area Ab1, of the first band image BI1 and a downstream (+Dy side) end portion, which includes the first superimposition area Ab1, of the second band image BI2 are shown. A small rectangle PX indicates a print pixel (hereinbelow, referred to as 'print pixel PX'). The print pixel PX is a pixel of the smallest unit in which an ink dot is to be formed. In parts except the first superimposition area Ab1, the rectangle indicative of the print pixel PX is not shown.

In each of the band images BI1, BI2, a hatched portion indicates a print pixel PX (also referred to as 'target pixel PXt') in which an ink dot can be formed, and an empty portion indicates a print pixel PX (also referred to as 'non-target pixel PXn') in which an ink dot is not to be formed. In a part, which is different from the superimposition area, of the band image, all the print pixels PX are the target pixels.

The first superimposition area Ab1 of the first band image BI1 and the first superimposition area Ab1 of the second band image BI2 are arranged in the same position on the sheet PM. The dots are dispersedly formed in the plurality of print pixels PX of the first superimposition area Ab1 by partial printing of the first band image BI1 and partial printing of the second band image BI2. Positions of the plurality of target pixels PXt in the first superimposition area Ab1 of the second band image BI2 correspond to positions of the plurality of non-target pixels PXn in the first superimposition area Ab1 of the first band image BI1, respectively.

In the first exemplary embodiment, the target pixels PXt are arranged in the first superimposition area Ab1 of the first band image BI1 so that a density of the target pixels PXt is to gradually decrease toward the second band image BI2. Pixel lines Ca, Cb in FIG. 4B are pixel lines extending in the main scanning direction (here, the Dx axis direction). The first pixel line Ca is a pixel line of the upstream (−Dy side) end in the first superimposition area Ab1. The second pixel line Cb is a pixel line of the downstream (+Dy side) end in the first superimposition area Ab1. In the first superimposition area Ab1 of the first band image BI1, a total number of the target pixels PXt of the first pixel line Ca is smaller than a total number of the target pixels PXt of the second pixel line Cb. Likewise, the target pixels PXt are arranged in the first superimposition area Ab1 of the second band image BI2 so that a density of the target pixels PXt is to gradually decrease toward the first band image BI1. In the first superimposition area Ab1 of the second band image BI2, a total number of the target pixels PXt of the second pixel line Cb is smaller than a total number of the target pixels PXt of the first pixel line Ca.

In this way, the arrangement of the target pixels PXt in the first superimposition area Ab1 is preset so that the density of the target pixels PXt is to gradually change between the first band image BI1 and the second band image BI2. The other superimposition areas (for example, the second superimposition areas Ab2, Ab3 in FIG. 4A) are also configured in the same manner as the first superimposition area Ab1.

Also, as described later, one band image may be dispersedly printed by two partial printings. In the example of FIG. 4A, the second band image BI2 includes two partial images PId, PIu aligned in the −Dy direction (more generally, the sub-scanning direction). Each of the partial images PId, PIu has a rectangular shape extending in the main scanning direction (here, the Dx axis direction). Each of the partial images PId, PIu is printed by single time partial printing. In the meantime, the sheet PM is not conveyed between the partial printing of the downstream partial image PId and the partial printing of the upstream partial image PIu. The position of the sheet PM in the conveying direction (the +Dy direction) during the printing of the partial images PId, PIu is the same as the position of the sheet PM in the conveying direction when printing the second band image BI2 by single time partial printing.

The two partial images PId, PIu adjacent to each other are partially overlapped. In FIG. 4A, a superimposition area Aa1 indicates an area in which the two partial images PId, PIu adjacent to each other are overlapped. The superimposition area Aa1 has a rectangular shape extending in the main scanning direction. A width Wa is a width of the superimposition area Aa1 in the sub-scanning direction. Hereinbelow, an area in which the two partial images adjacent to each other, like the superimposition area Aa1, is referred to as a first-type superimposition area. An area in which the two band images adjacent to each other, like the superimposition areas Ab1 to Ab3, is referred to as a second-type superimposition area.

Figure 4C:
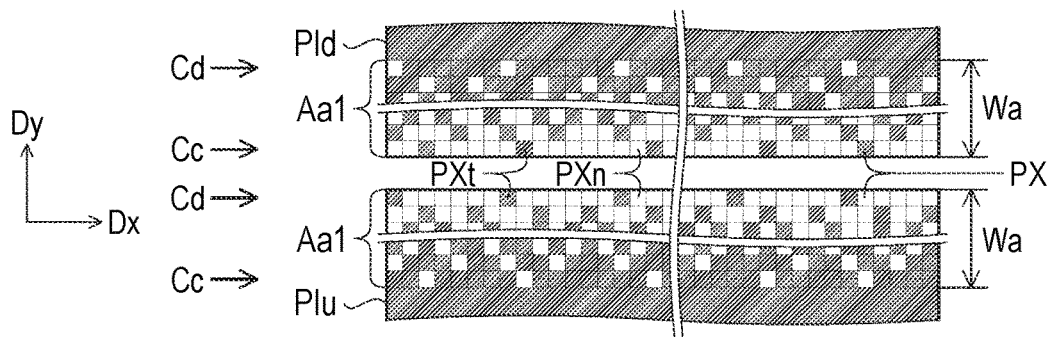
FIG. 4C illustrates a first-type superimposition area.

FIG. 4C illustrates the first-type superimposition area. In FIG. 4C, an upstream (−Dy side) end portion, which includes the superimposition area Aa1, of the downstream partial image PId and a downstream (+Dy side) end portion, which includes the superimposition area Aa1, of the upstream partial image PIu are shown. In the superimposition area Aa1, the print pixels PX are indicated by the rectangles. In parts except the superimposition area Aa1, the rectangle indicative of print pixel PX is not shown.

In each of the partial images PId, PIu, a hatched portion indicates a target pixel PXt, and an empty portion indicates a non-target pixel PXn. In a part, which is different from the first-type superimposition area and the second-type superimposition area, of the partial image, all the print pixels PX are the target pixels.

The superimposition area Aa1 of the downstream partial image PId and the superimposition area Aa1 of the upstream partial image PIu are arranged in the same position on the sheet PM. The dots are dispersedly formed in the plurality of print pixels PX of the superimposition area Aa1 by partial printing of the downstream partial image PId and partial printing of the upstream partial image PIu. Positions of the plurality of target pixels PXt in the superimposition area Aa1 of the upstream partial image PIu correspond to positions of the plurality of non-target pixels PXn in the superimposition area Aa1 of the downstream partial image PId, respectively.

In the first exemplary embodiment, the target pixels PXt are arranged in the superimposition area Aa1 of the downstream partial image PId so that a density of the target pixels PXt is to gradually decrease toward the upstream partial image PIu. Pixel lines Cc, Cd in FIG. 4C are pixel lines extending in the main scanning direction (here, the Dx axis direction). The third pixel line Cc is a pixel line of the upstream (−Dy side) end in the first superimposition area Ab1. The fourth pixel line Cd is a pixel line of the downstream (+Dy side) end in the superimposition area Aa1. In the superimposition area Aa1 of the downstream partial image PId, a total number of the target pixels PXt of the third pixel line Cc is smaller than a total number of the target pixels PXt of the fourth pixel line Cd. Also, the target pixels PXt are arranged in the superimposition area Aa1 of the upstream partial image PIu so that a density of the target pixels PXt is to gradually decrease toward the downstream partial image PId. In the superimposition area Aa1 of the upstream partial image PIu, a total number of the target pixels PXt of the fourth pixel line Cd is smaller than a total number of the target pixels PXt of the third pixel line Cc.

In this way, the arrangement of the target pixels PXt in the superimposition area Aa1 is preset so that the density of the target pixels PXt is to gradually change between the downstream partial image PId and the upstream partial image PIu. Also in a case where the other band image is divided into two partial images, the first-type superimposition area is configured in the same manner as the superimposition area Aa1.

A-3. Printing Processing

Figure 5:
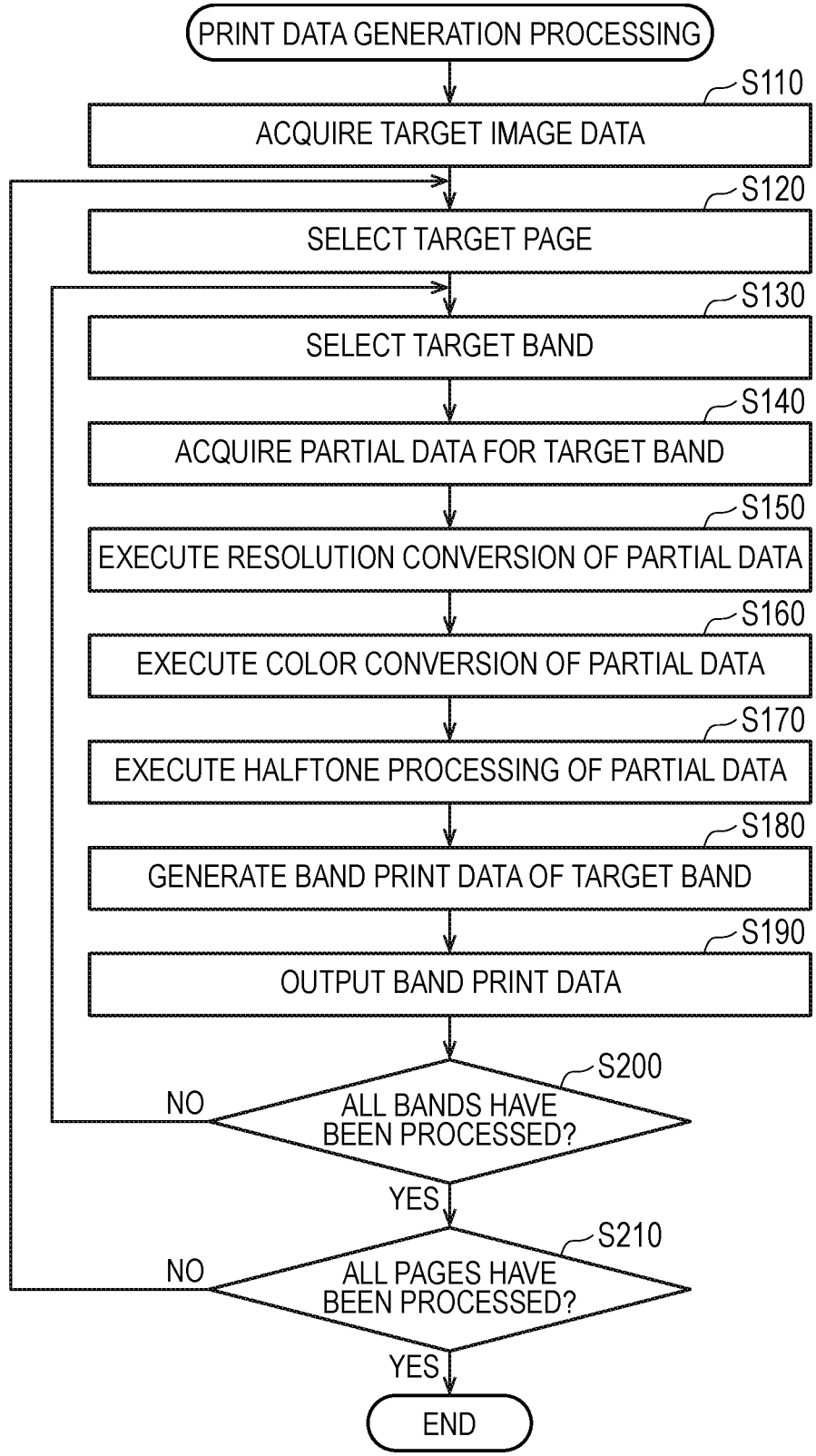
FIG. 5 is a flowchart depicting an example of print data generation processing.

FIG. 5 is a flowchart depicting an example of print data generation processing. In the first exemplary embodiment, the terminal apparatus 100 (FIG. 1) and the control unit 299 of the multifunction machine 200 can perform processing of print data for causing the printing execution unit 400 to print an image, respectively. The print data generation processing is initiated on the basis of a printing instruction from the user. Hereinbelow, it is described that the terminal apparatus 100 executes the print data generation processing.

The printing instruction may be input by any method. In the first exemplary embodiment, the user inputs a printing instruction by operating the operation unit 150 (FIG. 1). The printing instruction includes information of designating image data for printing. Hereinbelow, the image data designated in the printing instruction is referred to as target image data. Also, an image of the target image data is referred to as a target image. As the target image data, diverse data may be designated. For example, the image data stored in the storage device 115 (for example, the non-volatile storage device 130) or image data generated by an application operating in the terminal apparatus 100 may be designated.

In the first exemplary embodiment, the target image data is bitmap data, and a pixel value of each pixel of the target image data is indicated by a gradation value of R (red) G (green) B (blue) of 256 gradations from 0 to 255. When a format of the designated image data is a format (for example, EMF (Enhanced Meta File) format) different from the bitmap format, the processor 110 uses, as the target image data, bitmap data generated by converting (for example, rasterization) the data format.

In S110, the processor 110 acquires the target image data. The processor 110 analyzes the target image data to specify the number of pages Q (Q: an integer of 1 or larger). In S120, the processor 110 selects a head page of not-processed pages of Q pages, as a target page that is a processing target page. Hereinbelow, an image of the target page is referred to as a target page image.

In S130, the processor 110 selects a band image of the +Dy side end, which is a not-processed band image, of a plurality of band images included in the target page image, as a target band image, which is a processing target band image. As shown in FIG. 4A, the processor 110 allots, on the target page image, an area of each of the plurality of band images from a +Dy direction-side end of the target page image toward the −Dy direction, in accordance with the nozzle length D and the width Wb. Then, the processor 110 selects the most downstream (+D side) band image of the not-processed band images, as the target band image.

In S140, the processor 110 acquires partial data indicative of the target band image from the target image data. In S150, the processor 110 executes resolution conversion processing for the partial data. The resolution conversion processing is processing of converting a resolution of the partial data into a preset printing resolution for printing.

In S160, the processor 110 executes color conversion processing for the partial data. The color conversion processing is processing of converting color values (RGB values, in the first exemplary embodiment) indicated by the partial data into color values of an ink color space. The ink color space is a color space corresponding to colors of a plurality of usable inks for printing. The color values of the ink color space include a plurality of component values (CMYK values, in the first exemplary embodiment) corresponding to the colors of the plurality of types of inks. In the first exemplary embodiment, the processor 110 executes the color conversion processing, with reference to a color conversion profile. The color conversion profile is data indicative of a correspondence relation between color values of a target color space, which is a color space of the target image data, and the color values of the ink color space. In the first exemplary embodiment, a preset look-up table (not shown) is used as the color conversion profile. The processor 110 converts the color values of the respective pixels indicated by the resolution-converted partial data into the color values of the ink color space, with reference to the look-up table.

In S170, the processor 110 executes halftone processing for the color-converted partial data. The halftone processing may be processing of diverse methods, such as an error diffusion method, a method of using a dither matrix, and the like. By the halftone processing, a formation state of dot is determined for each color component and for each print pixel. The formation state of dot is a state of a dot to be formed by printing, and is any one of "no dot" and "dot is present", in the first exemplary embodiment. Instead, the formation state of dot may be selected from three or more states (for example, "large dot", "medium dot", "small dot" and "no dot") including two or more states "dot is present" in which dot sizes are different each other.

In S180, the processor 110 generates band print data, which is the print data of the target band image, by using data indicative of a result of the halftone processing. The print data is data having a data format that can be analyzed by the multifunction machine 200 (in the first exemplary embodiment, the control circuit 490 of the printing execution unit 400). The band print data includes information of specifying a print pixel in which an ink dot is to be formed, information indicative of a printing direction of the partial printing (i.e., a moving direction of the printing head 410 during the partial printing), and information about pages. In S190, the processor 110 outputs the band print data to the multifunction machine 200. The processor 210 of the multifunction machine 200 temporarily stores the received band print data in the storage device 215 (for example, the non-volatile storage device 230). Then, the processor 210 causes the printing execution unit 400 to print a band image by using the band print data (which will be described in detail later).

In S200, the processor 110 determines whether all the band images of the target page have been processed. When it is determined that there is a band image not processed yet (S200: No), the processor 110 proceeds to S130, and executes processing for the not-processed band image.

When it is determined that all the band images of the target page have been processed (S200: Yes), the processor 110 determines in S210 whether all the pages have been processed. When it is determined that there is a page not processed yet (S210: No), the processor 110 proceeds to S120, and executes processing for the not-processed page. When it is determined that all the pages have been processed (S210: Yes), the processor 110 ends the processing of FIG. 5. By the above, the processor 11 generates the plurality of band print data one by one in order to be printed. Then, the processor 110 outputs the plurality of band print data to the multifunction machine 200 one by one in order to be printed.

Figure 6:
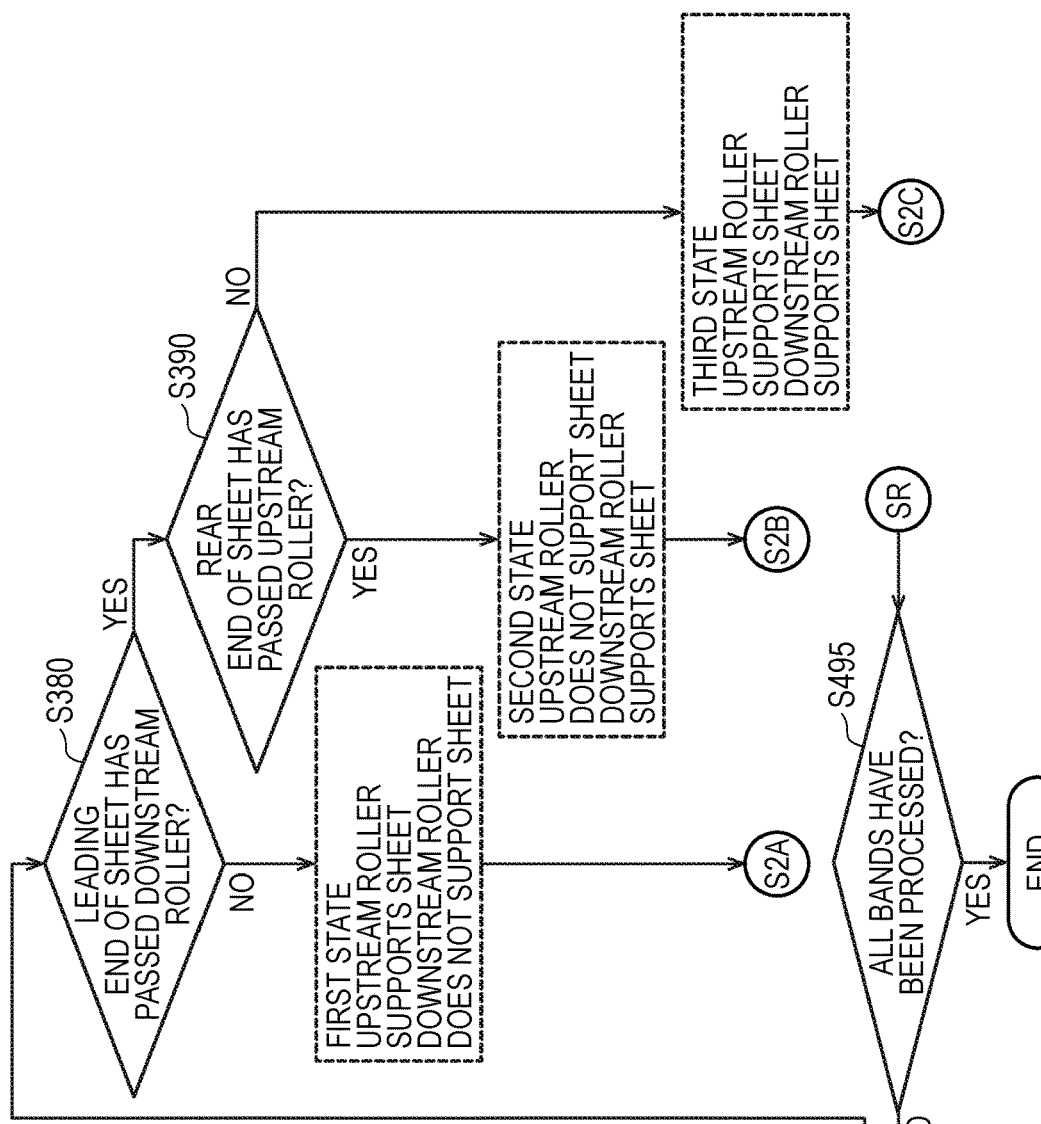
FIG. 6 is a flowchart depicting an example of printing execution processing.
Figure 7:
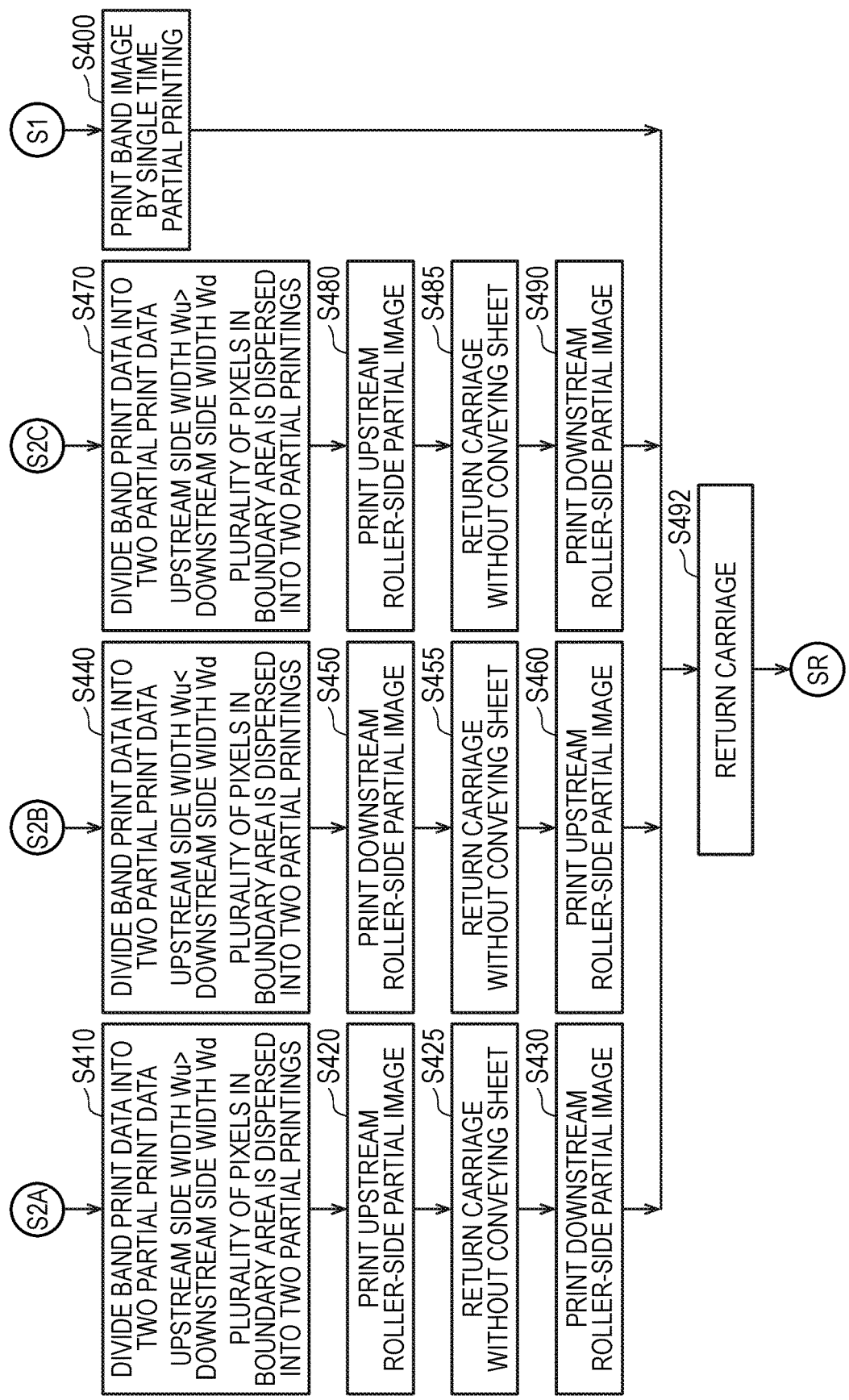
FIG. 7 is a flowchart depicting an example of the printing execution processing.

FIGS. 6 and 7 are flowcharts depicting an example of printing execution processing. FIG. 7 depicts the processing subsequent to FIG. 6. The printing execution processing is processing of causing the printing execution unit 400 (FIG. 1) to print an image by using the print data. The printing execution processing is executed by the control unit 299 of the multifunction machine 200 (FIG. 1). The processor 210 of the control unit 299 starts the printing execution processing when it acquires the band print data.

In S310, the processor 210 (FIG. 1) acquires the band print data. In the first exemplary embodiment, the processor 210 acquires the band print data to be first printed, from the band print data stored in the storage device 215. Hereinbelow, the band print data, which is the acquired processing target, is also referred to as target band data. An image of the target band data is also referred to as a target band image.

In S320, the processor 210 causes the printing execution unit 400 to convey the sheet PM so that a position of the sheet PM in the conveying direction is to be a position in which the target band image is to be printed. In the first exemplary embodiment, the processor 210 specifies a current position of the sheet PM in the conveying direction by using signals from the rotary encoder 443 (FIG. 2) and the sheet sensor 444. Then, the processor 210 causes the printing execution unit 400 to convey the sheet PM so that the current position of the sheet PM is to be a position in which the target band image is to be printed. In the meantime, when the target band image is a first band image of a new page, the processor 210 controls the printing execution unit 400 to feed a new sheet PM to the conveyor unit 440.

In S330, the processor 210 acquires the number of exchange times of the ink cartridge. When exchanging the ink cartridge, the ink cartridge is demounted from the cartridge mounting part 451, and a new ink cartridge is then mounted to the cartridge mounting part 451. Therefore, the signals from the cartridge sensors 454K, 454Y, 454C, 454M change from the on signal to the off signal and then changes from the off signal to the on signal. The processor 210 monitors the signals from the cartridge sensors 454K, 454Y, 454C, 454M (FIG. 2), and determines that the cartridge has been exchanged when the above-described change in signal is detected. In the exchange frequency table 310 in the non-volatile storage device 230 (FIG. 1), the number of exchange times of each ink cartridge is stored. Upon shipment of the multifunction machine 200, the number of exchange times of each ink in the exchange frequency table 310 is initialized to zero. When the processor 210 detects exchange of the cartridge, the processor 210 adds 1 to the number of exchange times of corresponding ink cartridge in the exchange frequency table 310. The processor 210 specifies the number of exchange times of each ink cartridge by referring to the exchange frequency table 310. Usually, the ink cartridge is exchanged when a remaining amount of ink in the ink cartridge is equal to or smaller than a reference value. Therefore, the larger the number of exchange times is, the larger the cumulative-used amount of ink is. The number of exchange times is an index value of the cumulative-used amount of ink.

In S340, the processor 210 specifies a temperature of the printing head 410 by using the signal from the temperature sensor 470 (FIG. 2).

In S350, the processor 210 calculates a dot formation ratio of each ink to be used for printing, by using the target band data. The dot formation ratio is a ratio of the number of pixels of dot pixels to a total number of print pixels of the target band image. The dot pixel is a pixel having a value indicative of formation of a dot in the target band data. The greater the dot formation ratio is, the larger the used amount of ink by single time partial printing is. Hereinbelow, the used amount of ink by single time partial printing is also referred to as "pass-used amount of ink". The dot formation ratio is an index value of the pass-used amount of ink.

In the meantime, when the formation state of dot is selected from three or more states including two or more states "dot is present" in which dot sizes are different each other, a ratio of the number of pixels of dot pixels to which a weight value of a dot size is applied may be used as the dot formation ratio. For example, a dot pixel of "large dot" may be counted as one pixel, a dot pixel of "medium dot" may be counted as 0.5 pixel, and a dot pixel of "small dot" may be counted as 0.25 pixel.

In S360, the processor 210 determines for at least one ink to be used for printing whether a first condition is satisfied. The first condition is a condition indicating that a supply of the ink from the ink supply unit 450 to the printing head 410 is possibly delayed at the partial printing. In the first exemplary embodiment, the first condition is that "the dot formation ratio is greater than a determination threshold value". The determination threshold value is prescribed by the threshold value table 300 (FIG. 1).

Figure 8:
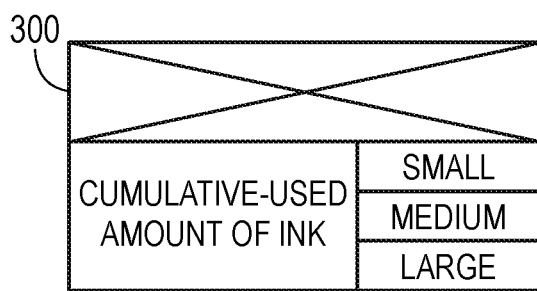
FIG. 8 illustrates an example of a threshold value table 300.

FIG. 8 illustrates an example of the threshold value table 300. In the threshold value table 300, combinations of the head temperature and the cumulative-used amount of ink and the determination threshold values are associated. In the example of FIG. 8, the head temperature is classified into three ranges "low", "medium" and "high", and the cumulative-used amount of ink is classified into three ranges "small", "medium" and "large". In the first exemplary embodiment, the number of exchange times of the ink cartridge is used as an index value of the cumulative-used amount of ink. As shown, when the cumulative-used amount of ink is constant, the lower the head temperature is, the smaller the determination threshold value is. The reason is that the lower the head temperature is, the more the delay in ink supply is likely to occur. Also, when the head temperature is constant, the larger the cumulative-used amount of ink is, the smaller the determination threshold value is. The reason is that the larger the cumulative-used amount of ink, the more the delay in ink supply is likely to occur.

The processor 210 specifies a determination threshold value associated with a combination of the head temperature and the cumulative-used amount of ink by referring to the threshold value table 300. In FIG. 8, for example, when the head temperature is within the preset range "medium" and the cumulative-used amount of ink is within the preset range "large", the determination threshold value is "75%".

The determination as to the first condition is made for each ink to be used for printing based on the target band data. For example, when printing based on the target band data is printing of using each ink of CMYK, the processor 210 specifies a determination threshold value for each ink of CMYK, and determines whether the first condition is satisfied. When the printing based on the target band data is printing of using only the black (K) ink, the processor 210 specifies a determination threshold value for the black (K) ink, and determines whether the first condition is satisfied. In the meantime, the determination threshold value may be common to the plurality of types of inks or may be preset for each ink.

When it is determined for all the inks to be used for printing that the first condition is not satisfied (S360: No), a possibility that the delay in ink supply will occur is low. In this case, in S400 (FIG. 7), the processor 210 causes the printing execution unit 400 to print the target band image by single time partial printing. For example, the processor 210 supplies the target band data to the printing execution unit 400. The control circuit 490 of the printing execution unit 400 controls each element of the printing execution unit 400 in accordance with the received target band data, thereby printing the target band image by single time partial printing. A printing direction of the partial printing is set to a direction indicated by the target band data. After the partial printing, in S492, the processor 210 supplies an instruction to move the carriage 433 in an opposite direction to the printing direction of the partial printing to the printing execution unit 400. The control circuit 490 of the printing execution unit 400 moves the carriage 433, in response to the instruction. In the first exemplary embodiment, since the printing direction is the forward direction (+Dx direction, in FIG. 4A), the carriage 433 is returned to the backward direction (−Dx direction) of the sheet PM. Then, the processor 210 proceeds to S495 (FIG. 6). In the meantime, the conveyance of the sheet PM for printing of a next band image is executed in S320 (FIG. 6).

When it is determined for at least one ink to be used for printing that the first condition is satisfied (S360: Yes), the ink supply may be delayed. In this case, in S370, the processor 210 specifies the current position of the sheet PM in the conveying direction. As described above, in the first exemplary embodiment, the position of the sheet PM is specified using the signals from the rotary encoder 443 (FIG. 2) and the sheet sensor 444.

In S380, the processor 210 determines whether a leading end (here, the downstream end) of the sheet PM has passed the downstream roller 442. When it is determined that the leading end of the sheet PM has not reached the downstream roller 442 (S380: No), the sheet PM is in a first state in which the sheet is supported by the upstream roller 441 and is not supported by the downstream roller 442.

Figure 9A:
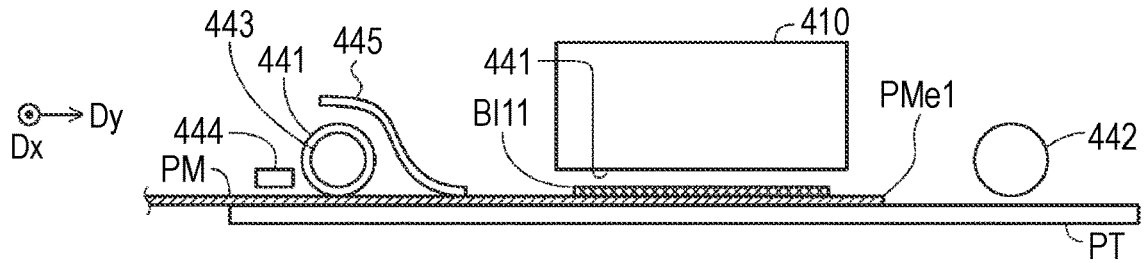
FIG. 9A is a schematic view depicting a sheet PM in a first state.

FIG. 9A is a schematic view depicting the sheet PM in the first state. In FIG. 9A, the printing execution unit 400 is schematically shown, as seen from the main scanning direction. An end PMe1 of the sheet PM is a downstream (+Dy side) end. As shown in, the sheet PM is not supported by the downstream roller 442 and is supported by the upstream roller 441 and the pressing parts 445.

When the sheet PM is in the first state (S380: No, FIG. 6), the processor 210 divides the target band data into two partial print data, in S410 (FIG. 7).

Figure 9B:
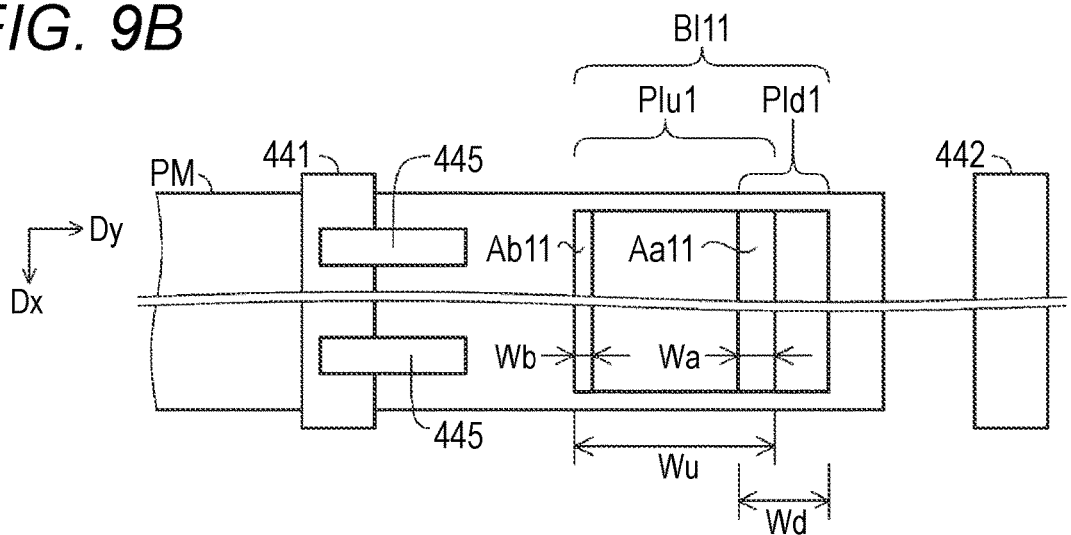
FIGS. 9B to 9D illustrate two partial print data.
Figure 9C:
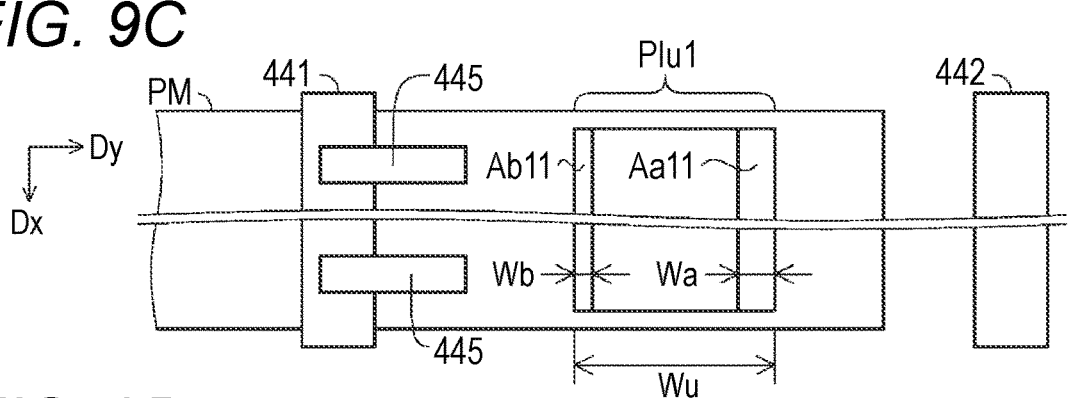
Figure 9D:
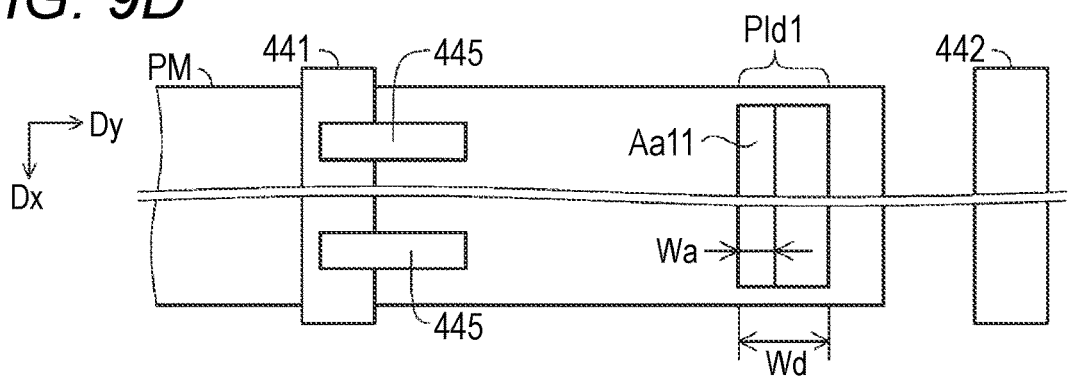

FIGS. 9B to 9D illustrate the two partial print data. In each of FIGS. 9B to 9D, the sheet PM, the rollers 441, 442 and the pressing parts 445 are schematically shown, as seen from above. FIG. 9B depicts a target band image BI11 and two partial images PId1, PIu1 included in the target band image BI11. FIG. 9C depicts the upstream partial image PIu1, and FIG. 9D depicts the downstream partial image PId1. The downstream partial image PId1 and the upstream partial image PIu1 are overlapped in a superimposition area Aa11. The configuration of the superimposition area Aa11 is the same as the configuration of the superimposition area Aa1 shown in FIG. 4C.

In the example of FIGS. 9B to 9D, the target band image BI11 is a band image at a downstream (+Dy side) end of the printed image. Since the other band image is not printed on the downstream side (+D side) of the downstream partial image PId1, a second-type superimposition area is omitted from the downstream end portion of the downstream partial image PId1. When printing the other band image on the downstream side (+D side) of the downstream partial image PId1, a second-type superimposition area in which the downstream partial image PId1 and the downstream band image are overlapped is provided. Also, the other band image is printed on the upstream side (−D side) of the upstream partial image PIu1. Therefore, the upstream end portion of the upstream partial image PIu1 is provided with a second-type superimposition area Ab11.

In S410 (FIG. 7), the processor 210 generates downstream partial print data, which is print data indicative of a downstream partial image, and upstream partial print data, which is print data indicative of an upstream partial image, by using the target band data. In the first exemplary embodiment, the print data includes dot data for each print pixel in which an ink dot is to be formed. The dot data is data indicative of a correspondence relation among a position of a print pixel in which an ink dot is to be formed, a type of ink and a dot size. The processor 210 may generate the downstream partial print data and the upstream partial print data by dividing the target band data into a part indicating the downstream partial image PId1 and a part indicating the upstream partial image PIu1. In the meantime, when the formation state of dot is any one of "dot is present" and "no dot", the information indicating the dot size may be omitted from the dot data. Also, the downstream partial print data and the upstream partial print data include information indicating the printing direction.

In S420, the processor 210 supplies the upstream partial print data to the printing execution unit 400, thereby causing the printing execution unit 400 to print an upstream partial image by single time partial printing. The upstream partial image is a partial image on the upstream roller 441-side (for example, the upstream partial image PIu1 in FIG. 9B).

The processing of S425 is the same as the processing of S492. The carriage 433 is returned to the opposite side to the printing direction of the sheet PM. Here, the sheet PM is not conveyed.

In S430, the processor 210 supplies the downstream partial print data to the printing execution unit 400, thereby causing the printing execution unit 400 to print a downstream partial image by single time partial printing. The downstream partial image is a partial image on the downstream roller 442-side (for example, the downstream partial image PId1 in FIG. 9B). After the processing of S430, the carriage 433 is returned to the opposite side to the printing direction of the sheet PM, in S492. Then, the processor 210 proceeds to S495 (FIG. 6).

A part of the sheet PM, in which an image has been printed using the ink, is likely to be deformed (for example, the sheet PM is curled). In particular, the larger the printed image is, the more the sheet PM is likely to be deformed. The deformed sheet PM may contact the nozzle formation surface 411 of the printing head 410. When the sheet PM is contacted to the nozzle formation surface 411, the ink may be attached to the sheet PM, resulting in smudging the sheet PM.

The sheet PM in the first state (FIG. 9A) is not supported by the downstream roller 442 and is supported by the upstream roller 441. Therefore, a portion, which is distant from the upstream roller 441, of the part of the sheet PM, in which the target band image BI11 is to be printed, is more likely to be deformed, as compared to a portion close to the upstream roller 441. In the first exemplary embodiment, the upstream partial image PIu1 close to the upstream roller 441 is printed earlier than the downstream partial image PId1 distant from the upstream roller 441 (FIG. 7: S420 to S430). Therefore, it is possible to prevent the sheet PM from being deformed at a printing of the downstream partial image PId1 which is executed later.

A width Wd in FIGS. 9B to 9D is a width of the downstream partial image PId1 in the sub-scanning direction (also referred to as 'downstream width Wd'). A width Wu is a width of the upstream partial image PIu1 in the sub-scanning direction (also referred to as 'upstream width Wu'). As shown, the width Wu of the upstream partial image PIu1 close to the upstream roller 441 supporting the sheet PM is larger than the width Wd of the downstream partial image PId1 distant from the upstream roller 441. Therefore, it is possible to print the large upstream partial image PIu1 while suppressing the deformation of the sheet PM. Meanwhile, in the first exemplary embodiment, the widths Wd, Wu that are used in S410 (FIG. 7) are preset.

When it is determined that the downstream end of the sheet PM has passed the downstream roller 442 (S380: Yes, FIG. 6), the processor 210 determines whether a rear end (here, an upstream end) of the sheet PM has passed the upstream roller 441, in S390. When it is determined that the rear end of the sheet PM has passed the upstream roller 441 (S390: Yes), the sheet PM is in a second state in which the sheet is not supported by the upstream roller 441 and is supported by the downstream roller 442.

Figure 10A:
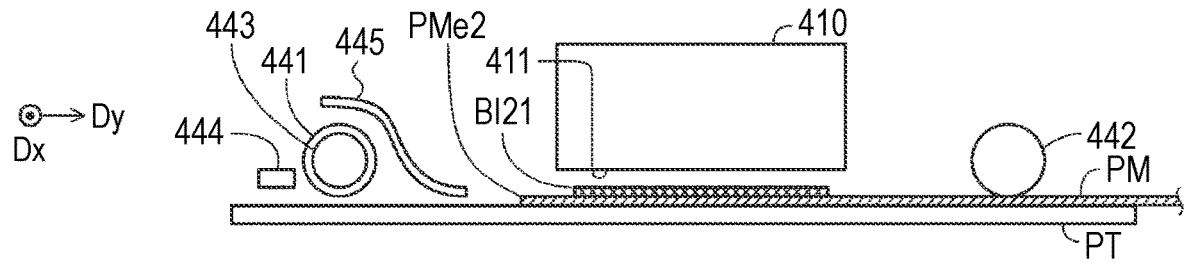
FIG. 10A is a schematic view depicting the sheet PM in a second state.

FIG. 10A is a schematic view depicting the sheet PM in the second state. In FIG. 10A, the printing execution unit 400 is schematically shown, as seen from the main scanning direction. An end PMe2 of the sheet PM is an upstream (−Dy side) end. As shown, the sheet PM is not supported by the upstream roller 441 and the pressing parts 445 and is supported by the downstream roller 442.

When it is determined that the sheet PM is in the second state (S390: Yes, FIG. 6), the processor 210 divides the target band data into two partial print data, in S440 (FIG. 7).

Figure 10B:
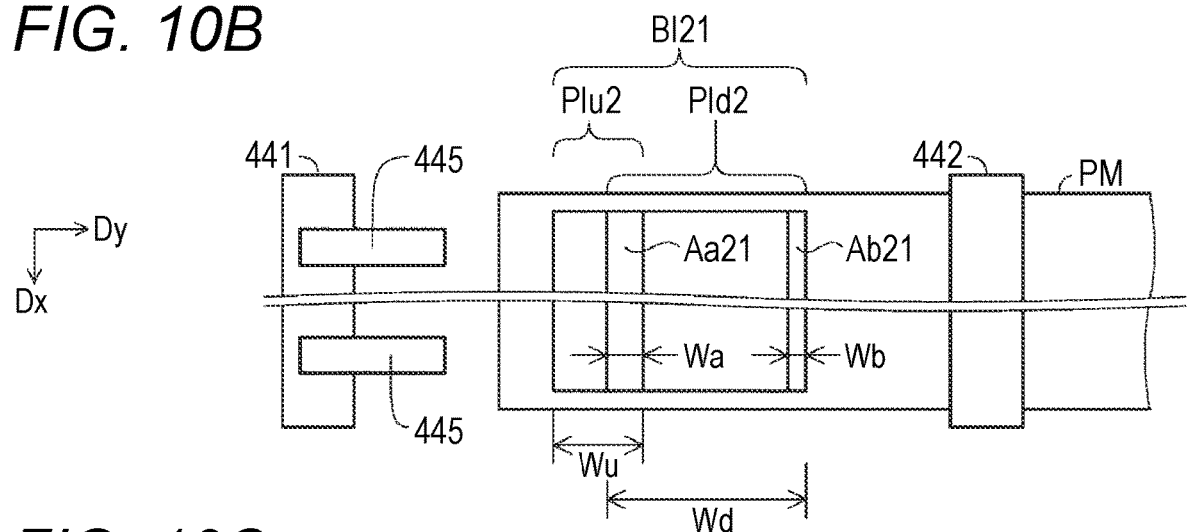
FIGS. 10B to 10D illustrate two partial print data.
Figure 10C:
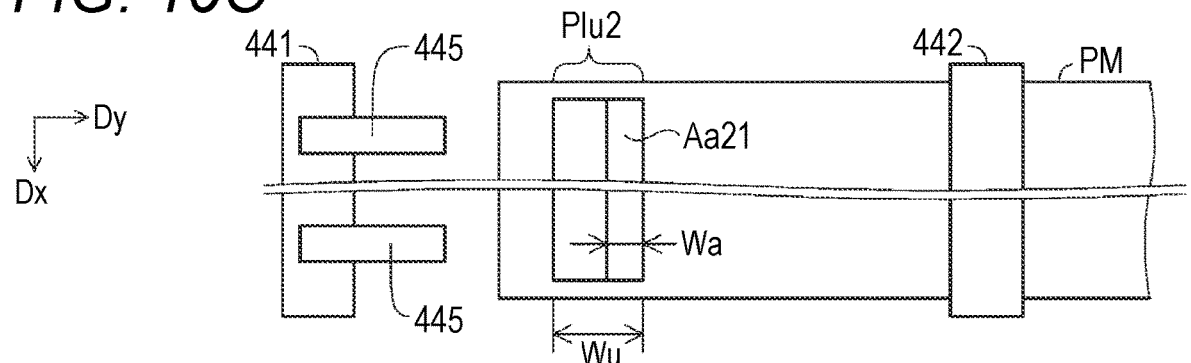
Figure 10D:
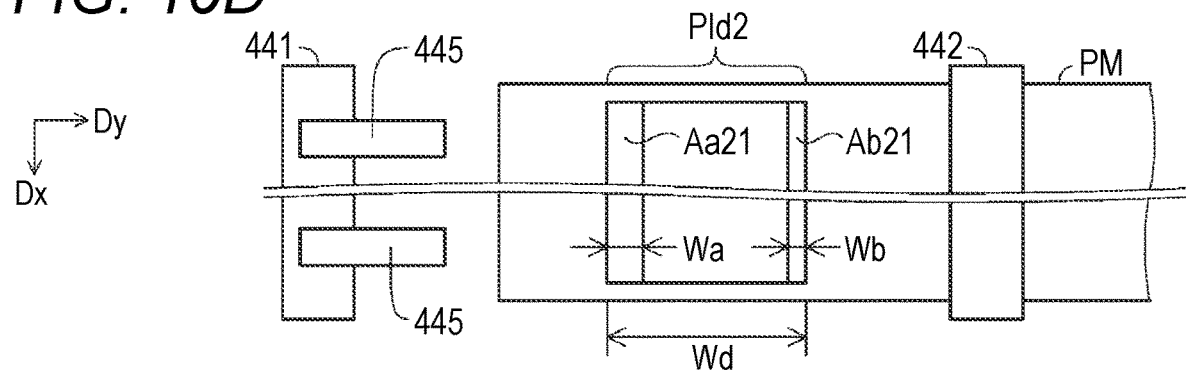

FIGS. 10B to 10D illustrate the two partial print data. In each of FIGS. 10B to 10D, the sheet PM, the rollers 441, 442 and the pressing parts 445 are schematically shown, as seen from above. FIG. 10B depicts a target band image BI21 and two partial images PId2, PIu2 included in the target band image BI21. FIG. 10C depicts the upstream partial image PIu2, and FIG. 10D depicts the downstream partial image PId2. The downstream partial image PId2 and the upstream partial image PIu2 are overlapped in a superimposition area Aa21. A configuration of the superimposition area Aa21 is the same as the configuration of the superimposition area Aa1 shown in FIG. 4C.

Meanwhile, in the example of FIGS. 10B to 10D, the target band image BI21 is a band image at the upstream (−Dy side) end of the printed image. Since the other band image is not printed on the upstream side (−D side) of the upstream partial image PIu2, a second-type superimposition area is omitted from the upstream end portion of the upstream partial image PIu2. When printing the other band image on the upstream side (−D side) of the upstream partial image PIu2, a second-type superimposition area in which the upstream partial image PIu2 and the upstream band image are overlapped is provided. Also, the other band image is printed on the downstream side (+D side) of the downstream partial image PId2. Therefore, the downstream end portion of the downstream partial image PId2 is provided with a second-type superimposition area Ab21.

The processing of S440 (FIG. 7) is the same as the processing of S410 except that the downstream width Wd is larger than the upstream width Wu (the widths Wd, Wu to be used in S440 are preset). The processing of S450 is the same as the processing of S430. The processing of S455 is the same as the processing of S425. The processing of S460 is the same as the processing of S420. After the processing of S460, the processor 210 returns the carriage 433 to the opposite side to the printing direction of the sheet PM in S492, and proceeds to S495 (FIG. 6).

The sheet PM in the second state (FIG. 10A) is not supported by the upstream roller 441 and is supported by the downstream roller 442. Therefore, a portion, which is distant from the downstream roller 442, of the part of the sheet PM, in which the target band image BI21 is to be printed, is more likely to be deformed, as compared to a portion close to the downstream roller 442. In the first exemplary embodiment, the downstream partial image PId2 close to the downstream roller 442 is printed earlier than the upstream partial image PIu2 distant from the downstream roller 442 (FIG. 7: S450 to S460). Therefore, it is possible to prevent the sheet PM from being deformed at a printing of the upstream partial image PIu2 which is executed later.

Also, as shown in FIGS. 10B to 10D, the width Wd of the downstream partial image PId2 close to the downstream roller 442 is larger than the width Wu of the upstream partial image PIu2 distant from the downstream roller 442. Therefore, it is possible to print the large downstream partial image PId2 while suppressing the deformation of the sheet PM.

When it is determined that the upstream end of the sheet PM has not passed the upstream roller 441 (S390: No, FIG. 6), the sheet PM is in a third state in which the sheet is supported by both the upstream roller 441 and the downstream roller 442.

Figure 11A:
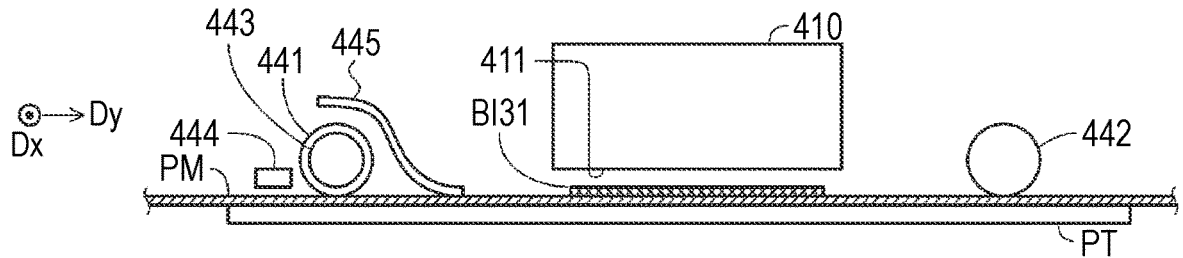
FIG. 11A is a schematic view depicting the sheet PM in a third state.

FIG. 11A is a schematic view depicting the sheet PM in the third state. In FIG. 11A, the printing execution unit 400 is schematically shown, as seen from the main scanning direction. As shown, the sheet PM is supported by the upstream roller 441, the pressing parts 445 and the downstream roller 442.

When it is determined that the sheet PM is in the third state (S390: No, FIG. 6), the processor 210 executes processing of S470 to S490 (FIG. 7). The processing of S470, S480, S485 and S490 is the same as the processing of S410, S420, S425 and S430, respectively. In S470, the processor 210 divides the target band data into two partial print data.

Figure 11B:
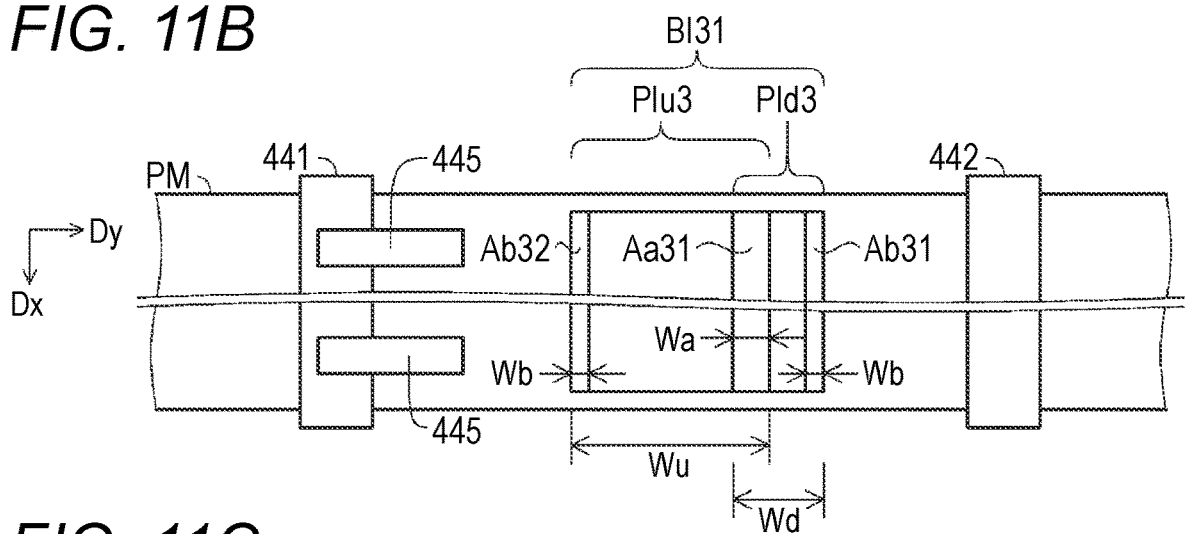
FIGS. 11B to 11D illustrate two partial print data.
Figure 11C:
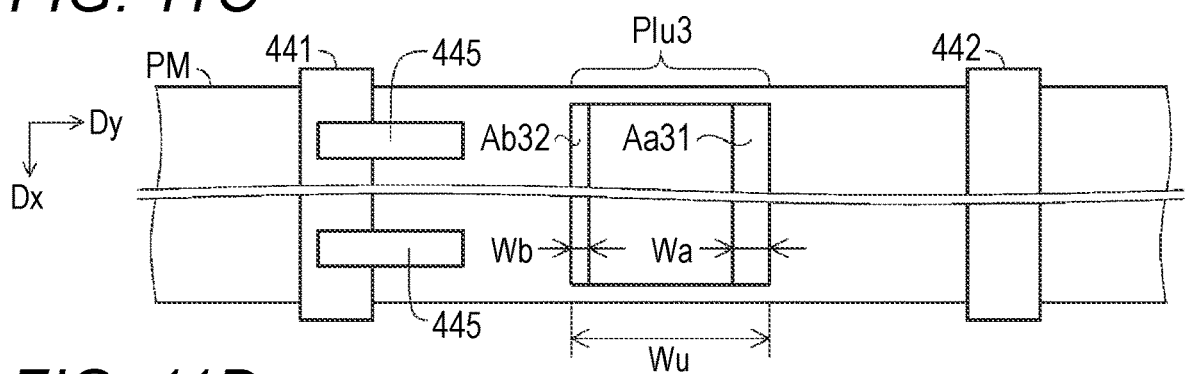
Figure 11D:
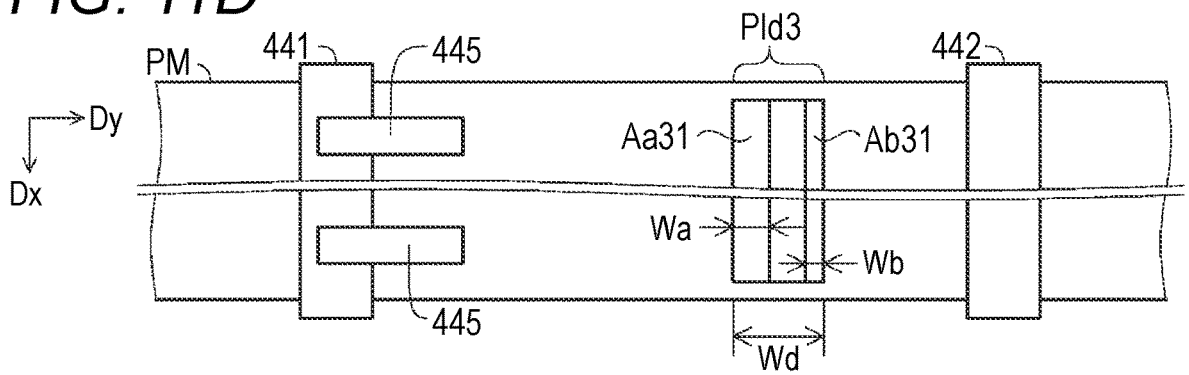

FIGS. 11B to 11D illustrate the two partial print data. In each of FIGS. 11B to 11D, the sheet PM, the rollers 441, 442 and the pressing parts 445 are schematically shown, as seen from above. FIG. 11B depicts a target band image BI31, and two partial images PId3, PIu3 included in the target band image BI31. FIG. 11C depicts the upstream partial image PIu3, and FIG. 11D depicts the downstream partial image PId3. The downstream partial image PId3 and the upstream partial image PIu3 are overlapped in a superimposition area Aa31. A configuration of the superimposition area Aa31 is the same as the configuration of the superimposition area Aa1 shown in FIG. 4C.

In the example of FIGS. 11B to 11D, the target band image BI31 is a band image sandwiched between two other band images. A downstream (+Dy side) end portion of the downstream partial image PId3 is provided with a second-type superimposition area Ab31. An upstream (−Dy side) end portion of the upstream partial image PIu3 is provided with a second-type superimposition area Ab32. When the other band image is not printed on the downstream side (+D side) of the downstream partial image PId3, the second-type superimposition area Ab31 is omitted. When the other band image is not printed on the upstream side (−D side) of the upstream partial image PIu3, the second-type superimposition area Ab32 is omitted.

After the processing of S490 (FIG. 7), the processor 210 returns the carriage 433 to the opposite side to the printing direction of the sheet PM in S492, and proceeds to S495 (FIG. 6).

In the first exemplary embodiment, the sheet PM in the third state (FIG. 11A) is supported by the pressing parts 445 as well as the upstream roller 441 and the downstream roller 442. Therefore, a portion, which is close to the pressing parts 445, of the part of the sheet PM, in which the target band image BI31 is to be printed, is suppressed from being deformed, as compared to a portion distant from the pressing parts 445. In the first exemplary embodiment, the downstream partial image PId3 close to the pressing parts 445 is printed earlier than the downstream partial image PId3 distant from the pressing parts 445 (S480 to S490, FIG. 7). Therefore, it is possible to prevent the sheet PM from being deformed at a printing of the downstream partial image PId3 which is executed later.

Also, as shown in FIGS. 11B to 11D, a width Wu of the upstream partial image PIu3 close to the pressing parts 445 is larger than a width Wd of the downstream partial image PId3 distant from the pressing part 445. Therefore, it is possible to print the large upstream partial image PIu3 while suppressing the deformation of the sheet PM.

In S495 (FIG. 6), the processor 210 determines whether all the band print data has been processed. When it is determined that there is band print data not processed yet (S495: No), the processor 210 proceeds to S310, and executes the processing for the not-processed band print data. When it is determined that all the band print data has been processed (S495: Yes), the processor 210 ends the printing execution processing of FIGS. 6 and 7.

As described above, in the first exemplary embodiment, the printing execution unit 400 (FIG. 1, FIG. 2) has a plurality of elements including the printing head 410, the ink supply unit 450 configured to supply the inks to the printing head 410, the main scanning unit 430 and the conveyor unit 440. The printing head 410 (FIG. 3) has the plurality of nozzles NZ for ejecting the inks of KYCM. Specifically, the printing head 410 has the black (K) nozzle row NK, the yellow (Y) nozzle row NY, the cyan nozzle row NC, and the magenta (M) nozzle row NM. The nozzle rows NK, NY, NC, NM are aligned side by side in the main scanning direction. The main scanning unit 430 (FIG. 2) is configured to execute the main scanning of moving the printing head 410 relative to the sheet PM in the main scanning direction. The conveyor unit 440 is configured to execute the sub-scanning of moving the sheet PM relative to the printing head 410 in the sub-scanning direction (also referred to as 'conveying direction') intersecting with the main scanning direction (hereinbelow, the conveyor unit 440 is also referred to as the sub-scanning unit 440). As shown in FIG. 2, the sub-scanning unit 440 includes the upstream roller 441 configured to convey the sheet PM on the further upstream side (−D side) than the printing head 410, and the downstream roller 442 configured to convey the sheet PM on the further downstream side (+D side) than the printing head 410. As described above with reference to FIG. 4 and the like, the printing execution unit 400 executes the printing by repeating the partial printing of causing the printing head 410 to form the dots on the sheet PM while executing the main scanning, and the sub-scanning respectively.

In S360 (FIG. 6), the processor 210 determines whether the first condition, which indicates that a supply of the ink from the ink supply unit 450 to the printing head 410 is possibly delayed at the partial printing, is satisfied. This determination is made for each of the plurality of band images included in an image to be printed and aligned in the sub-scanning direction. When it is determined that the first condition is not satisfied (S360: No), the processor 210 causes the printing execution unit 400 to print the band image by single time partial printing, as described in S400 of FIG. 7.

When it is determined that the first condition is satisfied (S360: Yes, FIG. 6), the processor 210 causes the printing execution unit 400 to print the two partial images one by one, which are included in the band image and are aligned in the sub-scanning direction, by two partial printings, as described in S410 to S430, S440 to S460 and S470 to S490 of FIG. 7. Therefore, since the ink amount to be used in the single time partial printing is reduced, it is possible to suppress the delay in ink supply.

Here, in the first case (S380: No) where the first condition is satisfied (S360: Yes, FIG. 6) and the sheet PM is supported by the upstream roller 441 and is not supported by the downstream roller 442, the processor 210 executes the processing of S410 to S430 in FIG. 7. The processor 210 causes the printing execution unit 400 to print the upstream partial image PIu1 (S420), which is located at the upstream end, of the two partial image PId1, PIu1 (FIG. 9B) earlier than the downstream partial image PId1 (S430) at the downstream end.

Also, in the second case (S380: Yes, S390: Yes) where the first condition is satisfied (S360: Yes, FIG. 6) and the sheet PM is not supported by the upstream roller 441 and is supported by the downstream roller 442, the processor 210 executes the processing of S440 to S460 in FIG. 7. The processor 210 causes the printing execution unit 400 to print the downstream partial image PId2 (S450), which is located at the downstream end, of the two partial image PId2, PIu2 (FIG. 10B) earlier than the upstream partial image PIu2 (S460) at the upstream end.

In this way, when the first condition is satisfied, the partial image PIu1; PId2 of the two partial images, which is located at the end facing toward the roller, which supports the sheet PM, of the upstream roller 441 and the downstream roller 442, is printed earlier than the partial image PId1; PIu2 located at the opposite side end. Therefore, it is possible to prevent the sheet PM from being deformed at a printing of the partial image PId1; PIu2 which is executed later.

Also, as described above with reference to FIG. 9B, in the first case (FIG. 6: S360: Yes, S380: No), the width Wu in the sub-scanning direction of the upstream partial image PIu1 located at the upstream end is larger than the width Wd in the sub-scanning direction of the downstream partial image PId1 located at the downstream end. Also, as described above with reference to FIG. 10B, in the second case (FIG. 6: S360: Yes, S380: Yes, S390: Yes), the width Wd of the downstream partial image PId2 located at the downstream end is larger than the width Wu of the upstream partial image PIu2 located at the upstream end. In this way, the width of the partial image, which is located at the end facing toward the roller supporting the print medium, of the plurality of partial images, is larger than the width of the partial image located at the opposite side end. Therefore, it is possible to print the large partial image while suppressing the deformation of the sheet PM.

Also, as described above with reference to FIG. 4C and the like, the two partial images adjacent to each other are partially overlapped in the first-type superimposition area (for example, the superimposition area Aa1) extending in the main scanning direction. The processor 210 causes the printing execution unit 400 to print some pixels PX of the plurality of pixels PX in the first-type superimposition area by the partial printing for one partial image, and to print remaining pixels PX of the plurality of pixels PX in the first-type superimposition area by the partial printing for the other partial image. Therefore, it is possible to suppress a boundary between the two partial images adjacent to each other from being noticeable on the printed image.

Also, as described above with reference to FIG. 4B and the like, the two band images adjacent to each other are partially overlapped in the second-type superimposition area (for example, the superimposition area Ab1) extending in the main scanning direction. The processor 210 causes the printing execution unit 400 to print some pixels PX of the plurality of pixels PX in the second-type superimposition area by the partial printing for one band image, and to print remaining pixels PX of the plurality of pixels PX in the second-type superimposition area by the partial printing for the other band image. Therefore, it is possible to suppress a boundary between the two band images adjacent to each other from being noticeable on the printed image. Also, as described above with reference to FIGS. 4A to 4C and the like, the width Wa of the first-type superimposition area in the sub-scanning direction is larger than the width Wb of the second-type superimposition area in the sub-scanning direction. Therefore, it is possible to suppressing the boundary between the two partial images adjacent to each other from being noticeable on the printed image, when the first condition is satisfied.

Also, when the printing directions are opposite to each other between two partial printings, an overlapping order of the plurality of types of inks in one partial printing is opposite to an overlapping order of the plurality of types of inks in the other partial printing. For example, in the exemplary embodiment of FIG. 3, when the printing direction is the +Dx direction, the overlapping order of the inks is an order of MCYK, and when the printing direction is the −Dx direction, the overlapping order of the inks is an order of KYCM. When the overlapping order of the inks is different between the two printed colors, the two colors may be differently seen even in the case that the types of the overlapped inks and the amounts per unit area of the respective inks are the same.

In the first exemplary embodiment, as described above with reference to FIG. 4A and the like, when printing one band image Bi2 into the two partial images PId, PIu, the processor 210 moves the printing head 410 during the partial printing for the upstream partial image PIu, in the same direction as the moving direction of the printing head 410 during the partial printing for the downstream partial image PId. Therefore, the overlapping orders of the plurality of types of inks are the same between the upstream partial image PIu and the downstream partial image PId. As a result, it is possible to suppress the deviation of colors to be printed between the upstream partial image PIu and the downstream partial image PId. The printings of the upstream partial image and downstream partial image by the partial printings in the same printing direction are respectively executed in the first case (S360: Yes, S380: No, FIG. 6) and the second case (S360: Yes, S380: Yes, S390: Yes, FIG. 6). Therefore, it is possible to suppress the deviation of colors to be printed between the upstream partial image and the downstream partial image, in each of the first case and the second case.

Also, as described above with reference to FIG. 2, the printing execution unit 400 includes the pressing parts 445 configured to press the sheet PM on the further upstream side (−D side) than the printing head 410. In third case (S380: Yes, S390: No) where the first condition is satisfied (FIG. 6: S360: Yes) and the sheet PM is supported by the upstream roller 441 and the downstream roller 442 and is pressed by the pressing parts 445, the processor 210 executes the processing of S470 to S490 in FIG. 7. The processor 210 causes the printing execution unit 400 to print the upstream partial image PIu3 (S480), which is located at the upstream end, of the two partial images PId3, PIu3 (FIG. 11B) earlier than the downstream partial image PId3 (S490) located at the downstream end. In this way, in the third case, the partial image PIu3, which is located at the end facing toward the pressing parts 445, of the two partial images PId3, PIu3 is printed earlier than the partial image PId3 located at the opposite side end. Therefore, it is possible to prevent the sheet PM from being deformed at a printing of the partial image PId3 which is executed later.

Also, as described in S360 of FIG. 6, it is determined whether the first condition is satisfied based on the dot formation ratio, the number of exchange times of the ink cartridge and the head temperature. As described in S350 of FIG. 6, the dot formation ratio is a ratio of the dot pixels to the total number of print pixels of the target band image. The dot formation ratio is a value relating to the used amount of ink, which is calculated using the target band data that is the band image data corresponding to the band image to be printed by the partial printing, and the used amount of ink to be printed for printing of the band image. Also, as described in S330 of FIG. 6, the number of exchange times of the ink cartridge is a value relating to the cumulative-used amount of ink used for printing by the printing execution unit 400. Like this, it is determined whether the first condition is satisfied based on the value relating to the used amount of ink to be used for printing of the band image and the cumulative-used amount of ink. Therefore, it is possible to appropriately determine whether the first condition indicating that the ink supply may be delayed is satisfied.

B. Second Exemplary Embodiment

Figure 12A:
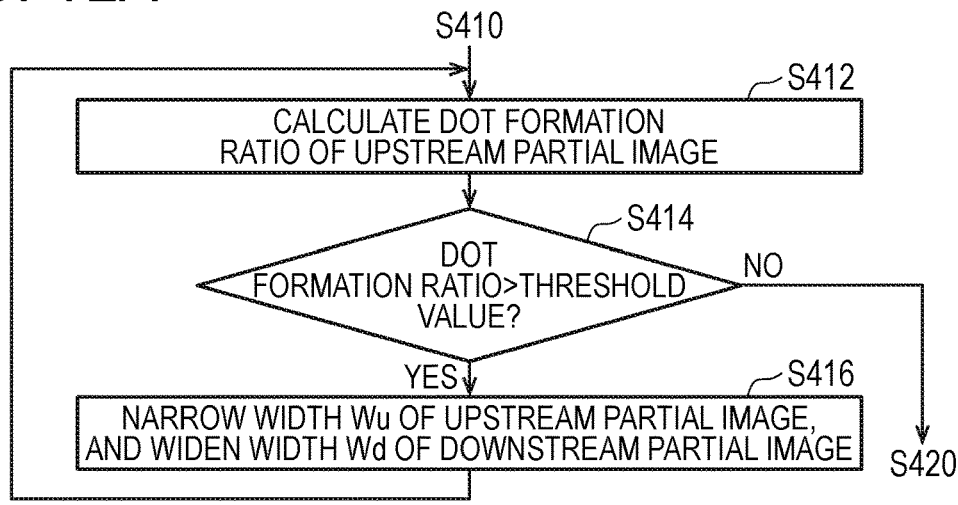
FIGS. 12A to 12C depict parts of a flowchart of a second exemplary embodiment of the printing execution processing.
Figure 12B:
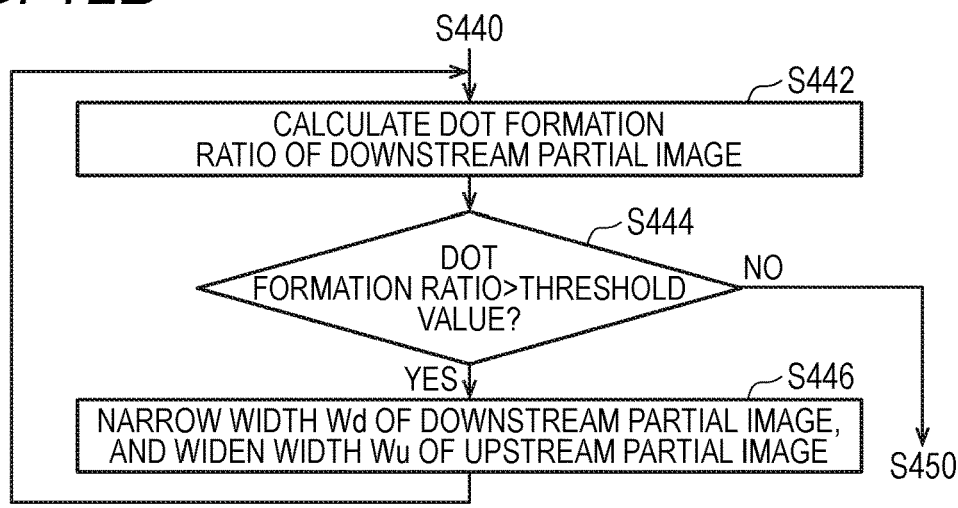
Figure 12C:
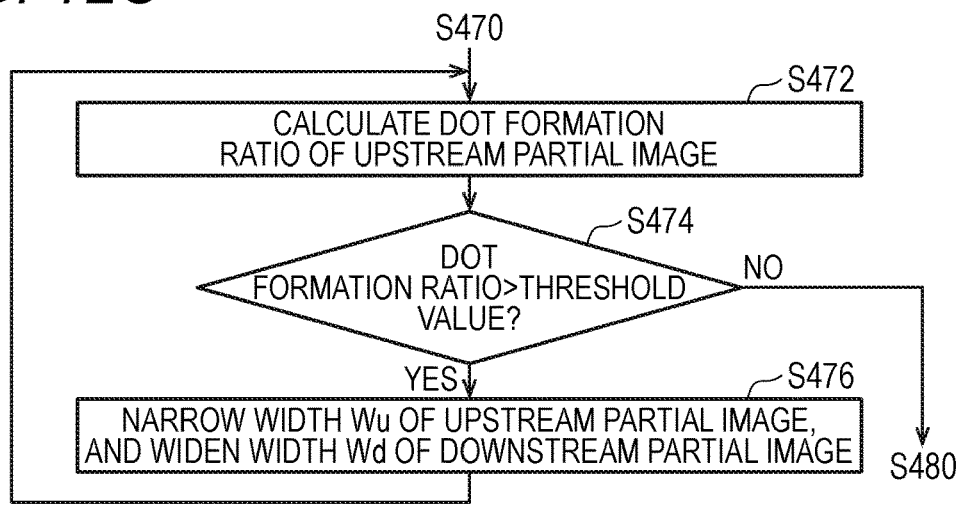

FIGS. 12A to 12C are parts of a flowchart of a second exemplary embodiment of the printing execution processing. In the second exemplary embodiment, the processor 210 adjusts a width of each partial image by using the dot formation ratio when dividing the band image into two partial images. FIGS. 12A to 12C depict processing of adjusting the width of the partial image. The processing of FIG. 12A is executed between S410 and S420 in FIG. 7. The processing of FIG. 12B is executed between S440 and S450. The processing of FIG. 12C is executed between S470 and S480. The other parts of the printing execution processing are the same as the corresponding parts of the printing execution processing shown in FIGS. 6 and 7. Hereinbelow, the processing of FIGS. 12A to 12C is described, and the descriptions of the other steps are omitted.

First, the processing of FIG. 12A is described. After the processing of S410 of FIG. 7, in S412 of FIG. 12A, the processor 210 calculates the dot formation ratio of each ink by using the upstream partial print data of the upstream partial image having a wide width. The dot formation ratio calculated in S412 is a ratio of dot pixels of the upstream partial image to the total number of print pixels of the target band image. Since the upstream partial image is smaller than the target band image, the dot formation ratio is smaller than 100% even in the case that all pixels of the upstream partial image are dot pixels.

Figure 13A:
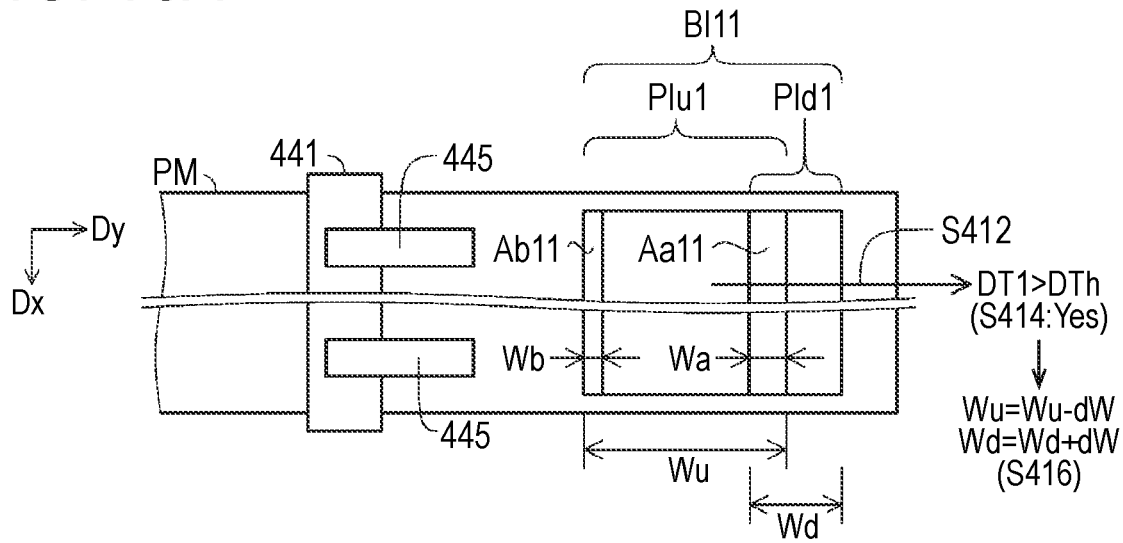
FIG. 13A is a schematic view depicting partial images PIu1, PId1.

FIG. 13A is a schematic view depicting the same partial images PIu1, PId1 as FIG. 9A. In FIG. 13A, a dot formation ratio DT1 is the dot formation ratio of the specific ink calculated in S412.

In S414 (FIG. 12A), the processor 210 determines whether a condition "the dot formation ratio of the upstream partial image is greater than a determination threshold value" is satisfied. In the second exemplary embodiment, the determination threshold value is the same as the determination threshold value used in S360 of FIG. 6. This determination is made for each ink to be used for printing based on the upstream partial print data, like the determination in S360. The determination condition in S414 is the condition indicating that a supply of the ink is possibly delayed at the partial printing based on the upstream partial print data. In the example of FIG. 13A, it is assumed that the dot formation ratio DT1 is greater than the determination threshold value DTh.

When the dot formation ratio is equal to or smaller than the determination threshold value for all inks to be used for printing, the determination result in S414 (FIG. 12A) is No, and the possibility of the delay in ink supply is low. In this case, the processor 210 proceeds to S420 of FIG. 7, and prints the partial image.

When it is determined for at least one ink to be used for printing that the dot formation ratio is greater than the determination threshold value, a determination result of S414 is Yes and the ink supply may be delayed. In this case, in S416, the processor 210 executes width adjustment of narrowing a width of the upstream partial image and widening a width of the downstream partial image, thereby generating the upstream partial print data and downstream partial print data having adjusted widths. In the second exemplary embodiment, as shown in FIG. 13A, a preset adjustment value dW is subtracted from the width Wu of the upstream partial image PIu1, and the adjustment value dW is added to the width Wd of the downstream partial image PId1.

Figure 13B:
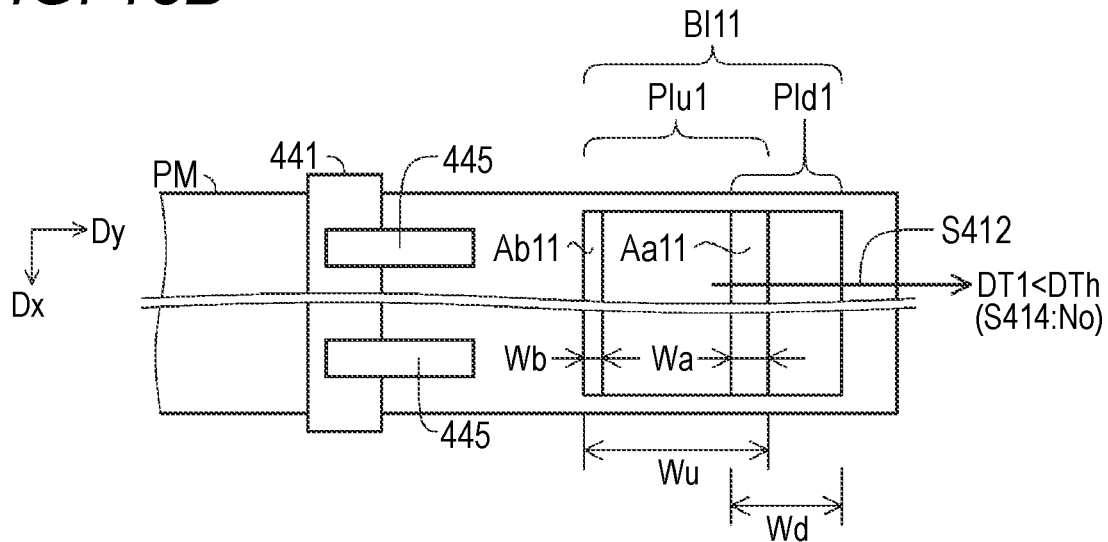
FIG. 13B is a schematic view depicting the partial images PIu1, PId1 having adjusted widths.

FIG. 13B is a schematic view depicting partial images PIu1, PId1 of which widths have been adjusted. The upstream partial image PIu1 having the adjusted width is smaller than the upstream partial image PIu1 (FIG. 13A) before the width adjustment. Therefore, the dot formation ratio DT1 can be made smaller than the determination threshold value DTh by the width adjustment.

After the processing of S416 (FIG. 12A), the processor 210 proceeds to S412. The processor 210 repeats the processing of S412 to S416 until the dot formation ratio becomes the determination threshold value or smaller.

Figure 14A:
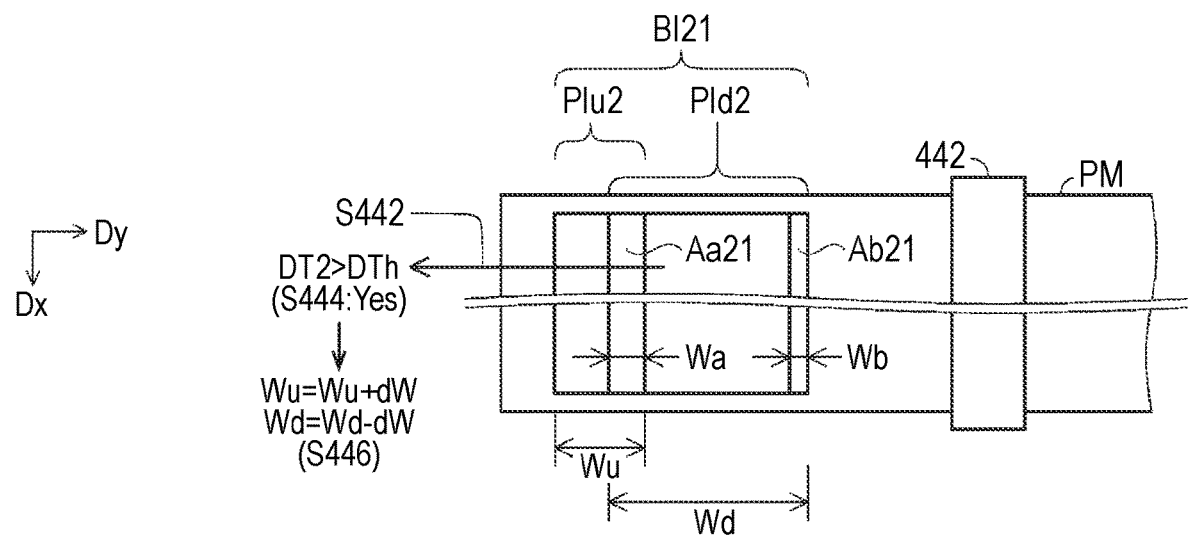
FIG. 14A is a schematic view depicting partial images PIu2, PId2.

Subsequently, processing of FIG. 12B is described. The processing of FIG. 12B is the same as processing obtained by changing positions of the upstream partial image and the downstream partial image in the processing of FIG. 12A. After the processing of S440 in FIG. 7, the processor 210 calculates the dot formation ratio of each ink to be used for printing by using the downstream partial print data of the downstream partial image having a wide width, in S442. FIG. 14A is a schematic view depicting the same partial images PIu2, PId2 as FIG. 10A. In FIG. 14A, a dot formation ratio DT2 is the dot formation ratio of the specific ink calculated in S442.

In S444 (FIG. 12B), the processor 210 determines whether a condition "the dot formation ratio of the downstream partial image is greater than the determination threshold value" is satisfied. This determination is made in the same manner as the determination in S414 (FIG. 12A). In the example of FIG. 14A, it is assumed that the dot formation ratio DT2 is greater than the determination threshold value DTh.

When it is determined for all inks to be used for printing that the dot formation ratio is equal to or smaller than the determination threshold value, a determination result in S444 (FIG. 12B) is No, and the possibility of the delay in ink supply is low. In this case, the processor 210 proceeds to S450 in FIG. 7, and prints the partial images.

When it is determined for at least one ink to be used for printing that the dot formation ratio is greater than the determination threshold value, a determination result in S444 is Yes, and the ink supply may be delayed. In this case, in S446, the processor 210 executes the width adjustment of narrowing the width of the downstream partial image and widening the width of the upstream partial image, thereby generating the upstream partial print data and downstream partial print data having adjusted widths. In the second exemplary embodiment, as shown in FIG. 14A, the adjustment value dW is added to the width Wu of the upstream partial image PIu1, and the adjustment value dW is subtracted from the width Wd of the downstream partial image PId1.

Figure 14B:
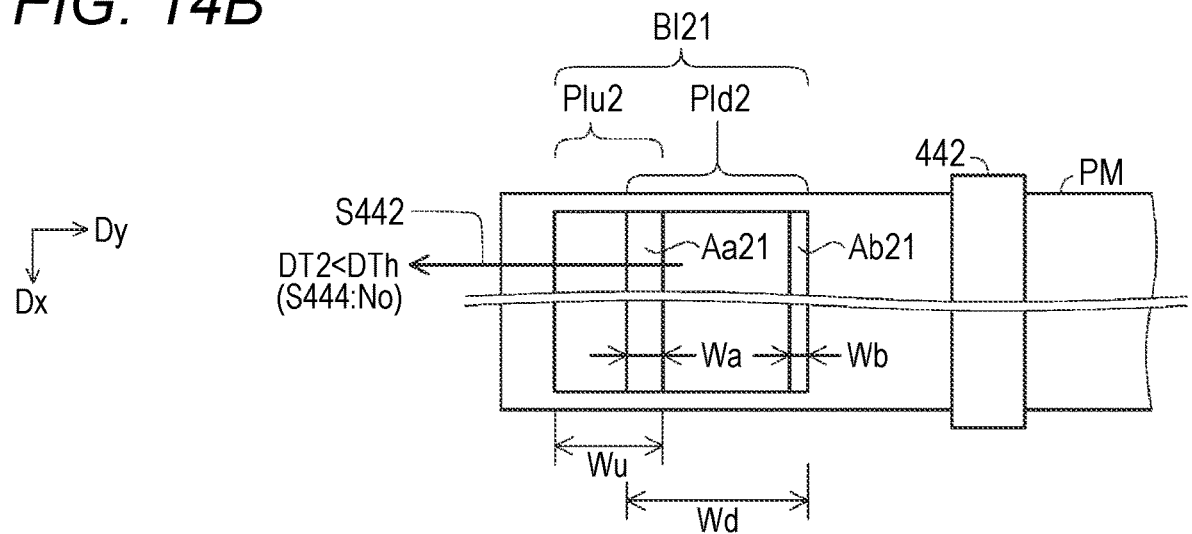
FIG. 14B is a schematic view depicting the partial images PIu2, PId2 having adjusted widths.

FIG. 14B is a schematic view depicting partial images PIu2, PId2 of which widths have been adjusted. The downstream partial image PId2 having the adjusted width is smaller than the downstream partial image PId2 (FIG. 14A) before the width adjustment. Therefore, the dot formation ratio DT2 can be made smaller than the determination threshold value DTh by the width adjustment.

After the processing of S446 (FIG. 12B), the processor 210 proceeds to S442. The processor 210 repeats the processing of S442 to S446 until the dot formation ratio becomes the determination threshold value or smaller.

Subsequently, processing of FIG. 12C is described. Processing of S472, S474 and S476 is the same as the processing of S412, S414 and S416 in FIG. 12A. After the processing of S470 in FIG. 7, the processor 210 proceeds to S472. The processor 210 repeats the processing of S472 to S476 until the dot formation ratio of the upstream partial image having a wide width becomes the determination threshold value or smaller. When it is determined that the dot formation ratio of the upstream partial image is the determination threshold value or smaller (S474: No), the processor 210 proceeds to S480 of FIG. 7, and prints the partial images.

As shown in FIG. 9B and FIG. 13A, in the first case (S360: Yes, S380: No, FIG. 6), the width Wu of the upstream partial image PIu1 at the upstream end in the sub-scanning direction is larger than the width Wd of the downstream partial image PId1 at the downstream end in the sub-scanning direction. As described above with reference to FIG. 12A, FIG. 13A and FIG. 13B, when the dot formation ratio DT1 of the upstream partial image PIu1 exceeds the threshold value DTh (S414: Yes), the processor 210 narrows the width Wu of the upstream partial image PIu1 in the sub-scanning direction, and widens the width Wd of the other partial image PId1 in the sub-scanning direction (S416). Here, the dot formation ratio DT1 is a value having correlation with the ink amount for partial printing of the upstream partial image PIu1 (the greater the dot formation ratio DT1 is, the larger the ink amount is).

Also, as shown in FIG. 10B and FIG. 14A, in the second case (S360: Yes, S380: Yes, S390: Yes, FIG. 6), the width Wd of the downstream partial image PId2 at the downstream end is larger than the width Wu of the upstream partial image PIu2 at the upstream end. As described above with reference to FIG. 12B, FIG. 14A and FIG. 14B, when the dot formation ratio DT2 of the downstream partial image PId2 exceeds the threshold value DTh (S444: Yes), the processor 210 narrows the width Wd of the downstream partial image PId2 in the sub-scanning direction, and widens the width Wu of the other partial image PIu2 in the sub-scanning direction (S446). Here, the dot formation ratio DT2 is a value having correlation with the ink amount for partial printing of the downstream partial image PId2 (the greater the dot formation ratio DT2 is, the larger the ink amount is).

As described above, when the ink supply for partial printing of the partial image having a wide width may be delayed, it is possible to narrow the width of the partial image having a wide width, so that the ink amount for partial printing is reduced. Therefore, it is possible to suppress the delay in ink supply for partial printing. Also, since it is possible to widen the width of the partial image having a narrow width, it is possible to appropriately print the band image.

Meanwhile, in the second exemplary embodiment, as described above with reference to FIG. 12C, also in the third case (S360: Yes, S380: Yes, S390: No, FIG. 6), it is possible to adjust the width of each partial image, like the first case (FIG. 12A). Therefore, also in the third case, it is possible to suppress the delay in ink supply for partial printing.

C. Modified Embodiments (1) The first condition in S360 (FIG. 6) may be any condition indicating that a supply of the ink from the ink supply unit to the printing head is possibly delayed at the partial printing. For example, instead of the number of exchange times of the cartridge, a cumulative-used amount of ink (for example, a used amount denoted with a millimeter unit) indicated by the print data may be used. In general, a variety of values relating to the cumulative-used amount of ink used for printing in the printing execution unit 400 may be used. Also, instead of the dot formation ratio, a used amount of ink (for example, a used amount denoted with a millimeter unit) calculated using the target band data may be used. In general, a variety of values relating to the used amount of ink calculated using the target band data may be used. Also, the first condition may be a variety of conditions to be determined by using at least one of a first index value, which is a value relating to the used amount of ink used for printing of the target band image as the used amount of ink calculated using the target band data, a second index value, which is a value relating to the cumulative-used amount of ink used for printing in the printing execution unit 400, and the head temperature. For example, the determination threshold value may be determined on the basis of any one, not both the second index value (the cumulative-used amount) and the head temperature.

(2) When the first condition is satisfied (S360: Yes, FIG. 6), one band image may be printed by N times partial printings (N: an integer of 2 or greater). Here, Each of N partial images included in one band image and aligned in the sub-scanning direction is printed by single time partial printing. In the meantime, the total number (N) of the partial images may be three or greater.

In the first case (S360: Yes, S380: No, FIG. 6), the processor 210 prints the partial image at the upstream end earlier than the partial image at the downstream end. The N partial images may be printed in order from the upstream side toward the downstream side. Also, the other images except the partial image at the upstream end and the partial image at the downstream end may be printed in arbitrary order. The width of each of the N partial images in the sub-scanning direction may gradually decrease from the upstream side toward the downstream side. Also, the width of each of the N partial images may be the same. The width of each of the N partial images may be arbitrarily set.

In the second case (S360: Yes, S380: Yes, S390: Yes, FIG. 6), the processor 210 prints the partial image at the downstream end earlier than the partial image at the upstream end. The N partial images may be printed in order from the downstream side toward the upstream side. Also, the other images except the partial image at the upstream end and the partial image at the downstream end may be printed in arbitrary order. The width of each of the N partial images in the sub-scanning direction may gradually decrease from the downstream side toward the upstream side. Also, the width of each of the N partial images may be the same. The width of each of the N partial images may be arbitrarily set.

In the third case (S360: Yes, S380: Yes, S390: No, FIG. 6), the processor 210 prints the partial image at the upstream end earlier than the partial image at the downstream end. The N partial images may be printed in order from the upstream side toward the downstream side. Also, the other images except the partial image at the upstream end and the partial image at the downstream end may be printed in arbitrary order. Also, in the third case, the N partial images may be printed in arbitrary order. The width of each of the N partial images in the sub-scanning direction may gradually decrease from the upstream side toward the downstream side. Also, the width of each of the N partial images may be the same. The width of each of the N partial images may be arbitrarily set.

(3) The N partial images may be printed through a variety of processing. Like the exemplary embodiment shown in FIGS. 6 and 7, the processor 210 may execute the N times partial printings without conveying the sheet PM. In this case, it is possible to suppress the dot formation position on the sheet PM from deviating between the N times partial printings, which is caused due to the conveyance of the sheet PM. Also, in the processing of generating the print data, correction (for example, correction of the ink amount) may be performed for each nozzle NZ, in accordance with a characteristic of each nozzle NZ. When executing the N times partial printings without conveying the sheet PM, the nozzle NZ for forming an ink dot in each print pixel is the same as the nozzle NZ that is used when printing the band image by single time partial printing. Therefore, it is possible to form the dots in the respective print pixels by the N times partial printings, in accordance with the print data appropriately corrected. On the other hand, the sheet PM may be conveyed between the N times partial printings.

Also, the printing direction may be the same between the N times partial printings. Thereby, since the ink overlapping order is the same between the N times partial printings, it is possible to suppress the deviation of color to be printed. On the other hand, the printing direction may be different between the plurality of partial printings. For example, the partial printing in the forward direction and the partial printing in the backward direction may be alternately executed.

(4) In the above exemplary embodiments, the printing direction is the same between the plurality of band images. Thereby, since the ink overlapping order is the same between the plurality of band images, it is possible to suppress the deviation of color to be printed. On the other hand, the printing direction may be different between the plurality of band images. For example, the partial printing in the forward direction and the partial printing in the backward direction may be alternately executed.

(5) In the first-type superimposition area (for example, the superimposition area Aa1 shown in FIG. 4C) where the two partial images adjacent to each other are overlapped, the target pixels PXt may be diversely arranged on each partial image. For example, the target pixels PXt may be equally arranged between the two partial images.

Also, in the second-type superimposition area (for example, the superimposition area Ab1 shown in FIG. 4B) where the two band images adjacent to each other are overlapped, the target pixels PXt may be diversely arranged on each band image. For example, the target pixels PXt may be equally arranged between the two band images.

Also, the width of the first-type superimposition area (for example, the width Wa of the superimposition area Aa1 shown in FIG. 4C) may be equal to or smaller than the width of the second-type superimposition area (for example, the width Wb of the superimposition area Ab1 shown in FIG. 4B).

In the meantime, the first-type superimposition area may be omitted. Also, the second-type superimposition area may be omitted.

(6) As the processing of adjusting the width of the partial image in the sub-scanning direction, a variety of other processing may be executed, instead of the processing of FIG. 12A to FIG. 12C. For example, instead of the dot formation ratio, a used amount of ink (for example, a used amount denoted with a millimeter unit) calculated using the partial image data may be used. In general, a variety of values relating to the used amount of ink calculated using the partial image data may be used. Also, the condition for adjusting the width (S414, S444, S474) may be different from the first condition (FIG. 6: S360) for printing the band image by the plurality of partial printings. For example, the threshold values in S414, S444 and S474 may be different from the determination threshold value of the first condition.

Also, even in the case that the determination results in S414, S444 and S474 are Yes, when the magnitude relation between the upstream width Wu and the downstream width Wd is reversed as a result of the width adjustment (S416, S446, S476), the width adjustment may be omitted and the processing may proceed to S420, S450 and S480. Also, the number of times of the width adjustment may be limited to a preset number of times (for example, one time). Also, when the total number (N) of the partial images is 3 or greater, the partial image of which a width is to be widened may be at least one partial image selected from two or more partial images different from a partial image of which a width is to be narrowed.

(7) As the method of specifying the current position of the sheet PM in the conveying direction, a variety of methods may be used. For example, the processor 210 may specify the position of the sheet in the conveying direction, based on the position of the target band image in the target page image, without using the signals from the rotary encoder 443 (FIG. 2) and the sheet sensor 444.

(8) As the configuration of the printing execution unit 400, a variety of other configurations may be used, instead of the configuration of the exemplary embodiment shown in FIGS. 1 to 3. For example, as the types of one or more useable ink, any types of one or more inks may be used. The printing head may have one nozzle row for ejecting one type of ink. The nozzle row includes the plurality of nozzles of which positions are different in the sub-scanning direction. Also, the printing head may have L nozzle rows provided so as to eject L types of inks (L: an integer of 2 or greater) and aligned side by side in the main scanning direction. Also, the cartridge mounting part 451 may be fixed to the carriage 433. The pressing parts 445 may be omitted. The platen PT may be omitted. The two rollers configured to sandwich the sheet PM may be used as the upstream rollers. Also, the two rollers configured to sandwich the sheet PM may be used as the downstream rollers. The rotary encoder 443 may be omitted. The sheet sensor 444 may be omitted. The sub-scanning unit 440 may have diverse configurations including an upstream roller configured to convey the print medium on the further upstream side than the printing head and a downstream roller configured to convey the print medium on the further downstream side than the printing head, for example. The main scanning unit 430 may have any configuration for executing the main scanning of moving the printing head relative to the sheet PM in the main scanning direction. The forward direction may be any one direction of the bidirectional main scanning direction. For example, the −Dx direction may correspond to the forward direction.

(9) In the above exemplary embodiments, the multifunction machine 200 is an example of a printing apparatus including the printing execution unit 400. The control unit 299 is an example of a control device of the printing apparatus including the printing execution unit 400. The print data generation processing (for example, the processing of FIG. 5) may be executed by the control device of the printing apparatus (for example, the control unit 299 of the multifunction machine 200), instead of the external apparatus (for example, the terminal apparatus 100) connected to the printing apparatus. The printing execution processing (for example, the processing of FIG. 6 and FIG. 7) may be executed by the external apparatus (for example, the terminal apparatus 100) connected to the printing apparatus, instead of the control device of the printing apparatus. In this case, the printing apparatus is an example of the printing execution unit, and the external apparatus is an example of the control device configured to control the printing apparatus (furthermore, the printing execution unit).

In any case, when the first condition is satisfied, the control device may generate the N partial print data by newly executing the image processing including the halftone processing, instead of dividing the target band data.

In the above exemplary embodiments, some of the configuration implemented by hardware may be replaced with software, and some or all of the configuration implemented by software may be replaced with hardware. For example, the control unit 299 of the multifunction machine 200 may be a dedicated hardware circuit for executing the printing execution processing.

Also, when some or all of the functions of the present disclosure are implemented by a computer program, the program may be provided while being stored in a computer-readable recording medium (for example, a non-transient recording medium). The program may be used while being stored in a recording medium (a computer-readable recording medium), which is the same as or different from the recording medium upon the provision. The "computer-readable recording medium" is not limited to a portable recording medium such as a memory card and a CD-ROM, and may include an internal storage device in a computer, such as a variety of ROMs, and an external storage device connected to the computer, such as a hard disk drive.

Although the present disclosure has been described with reference to the exemplary embodiments and the modified embodiments, the embodiments of the present disclosure are provided so as to easily understand the present disclosure, not to limit the present disclosure. The present disclosure can be changed and improved without departing from the gist thereof, and the present disclosure includes equivalents thereof.

What is claimed is:

1. A control device that controls an image printing executed by a printing execution unit,
   the printing execution unit comprising:
      a printing head having a plurality of nozzles for ejecting ink;
      an ink supply unit configured to supply the ink to the printing head;
      a main scanning unit configured to execute a main scanning of moving the printing head relative to a print medium in a main scanning direction; and
      a sub-scanning unit configured to execute a sub-scanning of moving the print medium relative to the printing head in a sub-scanning direction intersecting with the main scanning direction, wherein the printing execution unit repeats partial printing of ejecting the ink from the printing head while the main scanning unit executes the main scanning, and the sub-scanning by the sub-scanning unit respectively, to print an image on the print medium, and wherein the sub-scanning unit comprises:
an upstream roller conveying the print medium on a further upstream side than the printing head in the sub-scanning direction; and
a downstream roller conveying the print medium on a further downstream side than the printing head in the sub-scanning direction, and the control device is configured to perform:
determination processing of determining whether a first condition indicating that a supply of the ink from the ink supply unit to the printing head is possibly delayed at the partial printing is satisfied or not, for each of a plurality of band images included in an image to be printed and aligned in the sub-scanning direction;
first printing processing of, in a case where the first condition is not satisfied, causing the printing execution unit to print each band image by single time partial printing; and
second printing processing of, in a case where the first condition is satisfied, causing the printing execution unit to print each of N partial images (N is an integer of 2 or greater) included in each band image and aligned in the sub-scanning direction by single time partial printing, to print each band image by N times partial printings, wherein in a case where the control device performs the second printing processing, the control device is configured to cause the printing execution unit to:
in a first state that the print medium is supported by the upstream roller and is not supported by the downstream roller, print a first upstream partial image, which is located at an upstream end in the sub-scanning direction, included in the N partial images earlier than a first downstream partial image, which is located at a downstream end in the sub-scanning direction, included in the N partial images; and
in a second state that the print medium is not supported by the upstream roller and is supported by the downstream roller, print a second downstream partial image, which is located at a downstream end in the sub-scanning direction, included in the N partial images earlier than a second upstream partial image, which is located at an upstream end in the sub-scanning direction, included in the N partial images.

2. The control device according to claim 1,
wherein a width of the first upstream partial image in the sub-scanning direction is larger than a width of the first downstream partial image in the sub-scanning direction, and
wherein a width of the second downstream partial image in the sub-scanning direction is larger than a width of the second upstream partial image in the sub-scanning direction.

3. The control device according to claim 1,
wherein a first partial image being one of the N partial images and a second partial image being one of the N partial images adjacent to the first partial image are partially overlapped in a first-type superimposition area extending in the main scanning direction, and wherein in the second printing processing, the control device is configured to cause the printing execution unit to:
print some pixels of a plurality of pixels in the first-type superimposition area by the partial printing for the first partial image; and
print remaining pixels of the plurality of pixels in the first-type superimposition area by the partial printing for the second partial image.

4. The control device according to claim 3,
wherein a first band image being one of the plurality of band images and a second band image being one of the plurality of band images adjacent to the first band image are partially overlapped in a second-type superimposition area extending in the main scanning direction,
wherein in the first printing processing, the control device is configured to cause the printing execution unit to:
print some pixels of a plurality of pixels in the second-type superimposition area by the partial printing for the first band image; and
print remaining pixels of the plurality of pixels in the second-type superimposition area by the partial printing for the second band image, and
wherein a width of the first-type superimposition area in the sub-scanning direction is larger than a width of the second-type superimposition area in the sub-scanning direction.

5. The control device according to claim 1,
wherein in the second printing processing, the control device is configured to:
move the printing head in the same moving direction as a moving direction of the printing head in the partial printing for the first downstream partial image, in the partial printing for the first upstream partial image; and
move the printing head in the same moving direction as a moving direction of the printing head in the partial printing for the second downstream partial image, in the partial printing for the second upstream partial image.

6. The control device according to claim 1,
wherein the printing execution unit comprises a pressing part configured to press the print medium on the further upstream side than the printing head in the sub-scanning direction, and
wherein in the second printing processing, the control device is configured to cause the printing execution unit to:
in a third state that the print medium is supported by the upstream roller, is supported by the downstream roller, and is pressed by the pressing part, print a third upstream partial image, which is located at an upstream end in the sub-scanning direction, included in the N partial images earlier than a third downstream partial image, which is located at a downstream end in the sub-scanning direction, included in the N partial images.

7. The control device according to claim 1,
wherein in the second printing processing, the control device is configured to:
in a case where an ink amount for the partial printing of the first upstream partial image exceeds a threshold value, narrow a width of the first upstream partial image in the sub-scanning direction and widen a width of at least one of the other partial images in the sub-scanning direction; and in a case where an ink amount for the partial printing of the second downstream partial image exceeds the threshold value, narrow a width of the second downstream partial image in the sub-scanning direction and widen a width of at least one of the other partial images in the sub-scanning direction.

8. The control device according to claim 1, wherein it is determined whether the first condition is satisfied or not based on an index value, and wherein the index value is one of a value relating to a used amount of the ink used for printing of each band image, as a used amount of the ink calculated with using band image data corresponding to each band image to be printed by the partial printing, or a value relating to a cumulative-used amount of the ink used for printing in the printing execution unit.

9. A printing apparatus comprising:

the control device according to claim 1; and a printing execution unit comprising:

a printing head having a plurality of nozzles for ejecting ink;

an ink supply unit configured to supply the ink to the printing head;

a main scanning unit configured to execute a main scanning of moving the printing head relative to a print medium in a main scanning direction; and a sub-scanning unit configured to execute a sub-scanning of moving the print medium relative to the printing head in a sub-scanning direction intersecting with the main scanning direction, wherein the printing execution unit repeats partial printing of ejecting the ink from the printing head while the main scanning unit executes the main scanning, and the sub-scanning by the sub-scanning unit respectively, to print an image on the print medium.

10. A non-transitory computer-readable recording medium storing computer-readable instructions for a control device that controls an image printing executed by a printing execution unit, the printing execution unit comprises:

a printing head having a plurality of nozzles for ejecting ink;

an ink supply unit configured to supply the ink to the printing head;

a main scanning unit configured to execute a main scanning of moving the printing head relative to a print medium in a main scanning direction; and a sub-scanning unit configured to execute a sub-scanning of moving the print medium relative to the printing head in a sub-scanning direction intersecting with the main scanning direction, wherein the printing execution unit repeats partial printing of ejecting the ink from the printing head while the main scanning unit executes the main scanning, and the sub-scanning by the sub-scanning unit respectively, to print an image on the print medium, and wherein the sub-scanning unit comprises:

an upstream roller conveying the print medium on a further upstream side than the printing head in the sub-scanning direction; and a downstream roller conveying the print medium on a further downstream side than the printing head in the sub-scanning direction, and the computer-readable instructions, when executed by the control device, causing the control device to perform:

determination processing of determining whether a first condition indicating that a supply of the ink from the ink supply unit to the printing head is possibly delayed at the partial printing is satisfied or not, for each of a plurality of band images included in an image to be printed and aligned in the sub-scanning direction;

first printing processing of, in a case where the first condition is not satisfied, causing the printing execution unit to print the band image by single time partial printing; and second printing processing of, in a case where the first condition is satisfied, causing the printing execution unit to print each of N partial images (N is an integer of 2 or greater) included in the band image and aligned in the sub-scanning direction by single time partial printing, to print the band image by N times partial printings, wherein in a case where the control device performs the second printing processing, the computer-readable instructions cause the printing execution unit to perform:

in a first state that the print medium is supported by the upstream roller and is not supported by the downstream roller, print a first upstream partial image, which is located at an upstream end in the sub-scanning direction, included in the N partial images earlier than a first downstream partial image, which is located at a downstream end in the sub-scanning direction, included in the N partial images; and in a second state that the print medium is not supported by the upstream roller and is supported by the downstream roller, print a second downstream partial image, which is located at a downstream end in the sub-scanning direction, included in the N partial images earlier than a second upstream partial image, which is located at an upstream end in the sub-scanning direction, included in the N partial images.

* * * * *

UNITED STATES PATENT AND TRADEMARK OFFICE
CERTIFICATE OF CORRECTION

PATENT NO. : 10,882,327 B2
APPLICATION NO. : 16/570200
DATED : January 5, 2021
INVENTOR(S) : Satoru Arakane et al.

Page 1 of 1

It is certified that error appears in the above-identified patent and that said Letters Patent is hereby corrected as shown below:

In the Claims

Column 33, Claim 10, Line 43:
Please delete "unit comprises" and insert --unit comprising--

Column 34, Claim 10, Line 24:
Please delete "the band" and insert --each band--

Column 34, Claim 10, Line 29:
Please delete "the band" and insert --each band--

Column 34, Claim 10, Lines 31:
Please delete "the band" and insert --each band--

Column 34, Claim 10, Lines 36-37:
Please delete "to perform:" and insert --to:--

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*